United States Patent
Abdel-Rahman

(10) Patent No.: US 10,693,381 B1
(45) Date of Patent: Jun. 23, 2020

(54) STARTUP MODE FOR CONTROL OF A RESONANT POWER CONVERTER

(71) Applicant: Infineon Technologies Austria AG, Villach (AT)

(72) Inventor: Osama Abdel-Rahman, Raleigh, NC (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/206,933

(22) Filed: Nov. 30, 2018

(51) Int. Cl.
  *H02M 3/335* (2006.01)
  *H02M 1/36* (2007.01)
  *H02J 7/00* (2006.01)
  *H02M 1/08* (2006.01)
  *H02M 1/00* (2006.01)

(52) U.S. Cl.
  CPC ....... *H02M 3/33584* (2013.01); *H02J 7/0068* (2013.01); *H02M 1/083* (2013.01); *H02M 1/36* (2013.01); *H02M 2001/0009* (2013.01)

(58) Field of Classification Search
  CPC ................................................ H02M 3/33584
  See application file for complete search history.

(56) References Cited

U.S. PATENT DOCUMENTS

| | | | | |
|---|---|---|---|---|
| 2008/0150442 | A1* | 6/2008 | Feldtkeller | H05B 41/2828 315/209 R |
| 2009/0115388 | A1* | 5/2009 | Miyazaki | H02M 3/158 323/282 |
| 2012/0153912 | A1* | 6/2012 | Demski | H02M 3/07 323/282 |
| 2017/0093294 | A1* | 3/2017 | Dai | H02M 3/33507 |
| 2018/0301995 | A1* | 10/2018 | Chang | H02M 3/33546 |

OTHER PUBLICATIONS

Abdel-Rahman, "Resonant LLC Converter: Operation and Design 250W 33Vin 400Vout Design Example," Infineon Technologies, Application Note AN 2012-09, Sep. 2012, 19 pp.
Havanur, "Beware of Zero Voltage Switching," How2Power Newsletter, Mouser Electronics, Apr. 2016, 7 pp.
Huang, "Hard Commutation of Power MOSFET OptiMOS FD 200V/250V," Application Note AN 2014-03, Infineon Technologies, Mar. 12, 2014, 13 pp.

* cited by examiner

*Primary Examiner* — Daniel Kessie
*Assistant Examiner* — Trinh Q Dang
(74) *Attorney, Agent, or Firm* — Shumaker & Sieffert, P.A.

(57) ABSTRACT

In some examples, a controller includes a startup generation circuit configured to control, while operating in a first phase of a startup mode, a bridge circuit using peak detection and using zero-crossing detection of an electrical current through a tank circuit coupled to the bridge circuit. The startup generation circuit is also configured to control the bridge circuit using the zero-crossing detection while operating in a second phase of the startup mode after the first phase. The startup generation circuit is further configured to control the bridge circuit using a discontinuous-current mode for the electrical current while operating in a third phase of the startup mode after the second phase. The controller also includes a steady-state generation circuit configured to control the bridge circuit using soft switching while operating in a steady-state mode after the third phase of the startup mode.

19 Claims, 20 Drawing Sheets

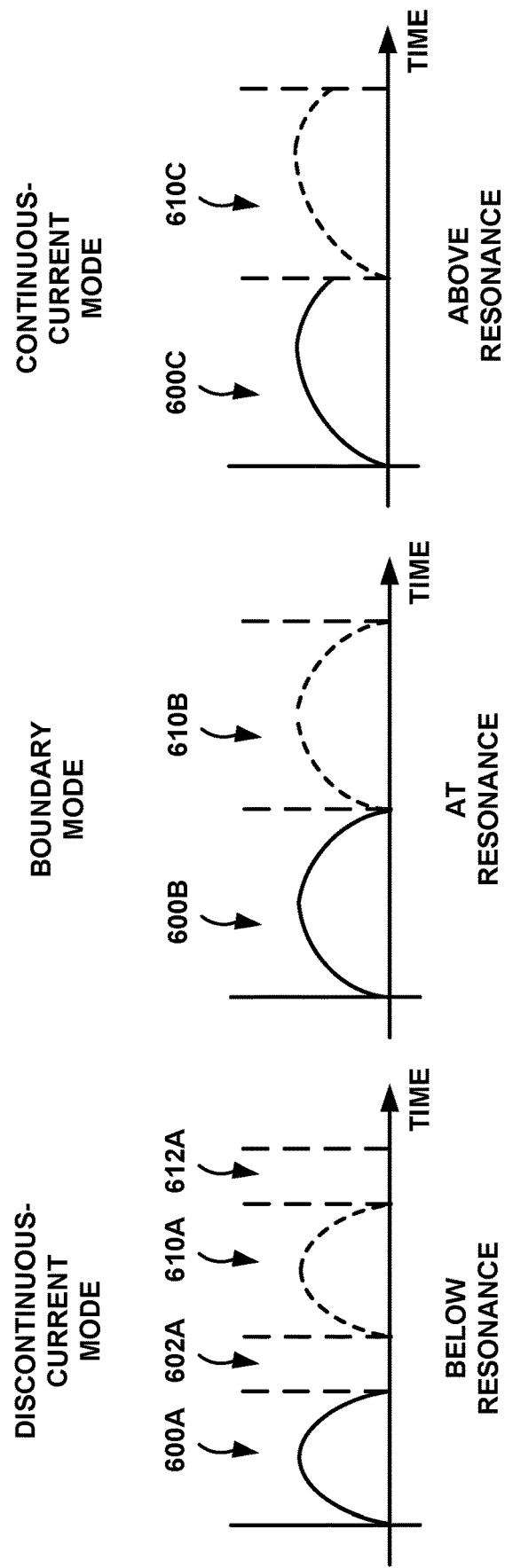

STARTUP MODE FOR CONTROL OF A RESONANT POWER CONVERTER

TECHNICAL FIELD

This disclosure relates to power electronics.

BACKGROUND

Systems such as photovoltaics (e.g., solar panels), electric vehicles, battery storage, and/or on-board charger for batteries can use bi-directional power converters. A bi-directional resonant converter can charge or discharge a storage battery from/to high voltage bus (e.g., four hundred volts). In a higher power application with a low voltage battery, the root-mean-square (RMS) current in the LC tank and bridge switches on the battery side can be very high. This high current presents a challenge, in terms of cost and efficiency, related to the selection of a resonant capacitor and the switches.

Moreover, in both bi-directional and uni-directional converters, another challenge is presented if the high voltage bridge switches are operating as rectifiers and using metal-oxide-semiconductor field-effect transistors (MOSFETs). For example, during discharge mode of a bi-directional converter, the switches on the bus side operate as rectifiers and are exposed to hard commutation (e.g., hard switching) of the antiparallel body diode. Hard commutation and the associated reverse recovery charge can induce high voltage spikes on the switches. Another example is that, for a uni-directional converter with high voltage output, hard commutation is a major concern if MOSFETs are used as synchronous rectifiers.

SUMMARY

This disclosure describes a controller configured to control a bridge circuit of a power converter. The controller includes a startup generation circuit configured to operate in a startup mode having three phases. The controller also includes a steady-state generation circuit configured to operate in a steady-state mode. The startup generation circuit is configured to operate in a first phase of the startup mode using peak detection and zero-crossing detection of a signal indicating an electrical current in the power converter. The startup generation circuit is also configured to control the bridge circuit using zero-crossing detection while operating in a second phase of the startup mode. The startup generation circuit is further configured to control the bridge circuit using discontinuous-current mode while operating in a third phase of the startup mode.

In some examples, a controller includes a startup generation circuit configured to control, while operating in a first phase of a startup mode, a bridge circuit using peak detection and using zero-crossing detection of an electrical current through a tank circuit coupled to the bridge circuit. The startup generation circuit is also configured to control the bridge circuit using the zero-crossing detection while operating in a second phase of the startup mode after the first phase. The startup generation circuit is further configured to control the bridge circuit using a discontinuous-current mode for the electrical current while operating in a third phase of the startup mode after the second phase. The controller also includes a steady-state generation circuit configured to control the bridge circuit using soft switching while operating in a steady-state mode after the third phase of the startup mode.

In some examples, a method includes controlling a bridge circuit, while operating in a first phase of a startup mode, using peak detection and using zero-crossing detection of an electrical current through a tank circuit coupled to the bridge circuit. The method also includes controlling the bridge circuit using the zero-crossing detection while operating in a second phase of the startup mode after the first phase. The method further includes controlling the bridge circuit using a discontinuous-current mode for the electrical current while operating in a third phase of the startup mode after the second phase.

In some examples, a device includes a computer-readable medium having executable instructions stored thereon, configured to be executable by processing circuitry for causing the processing circuitry to, while operating in a first phase of a startup mode, control the bridge circuit using peak detection and using zero-crossing detection of the voltage or the current through the tank circuit. The instructions further cause the processing circuitry to, while operating in a second phase of the startup mode after the first phase, control the bridge circuit using the zero-crossing detection. The instructions also cause the processing circuitry to, while operating in a third phase of the startup mode after the second phase, control the bridge circuit using a discontinuous-current mode.

The details of one or more examples are set forth in the accompanying drawings and the description below. Other features, objects, and advantages will be apparent from the description and drawings, and from the claims.

BRIEF DESCRIPTION OF DRAWINGS

FIGS. 6A-6C are graphs of operation in a discontinuous-current mode, a boundary mode, a continuous-current mode, in accordance with some examples of this disclosure.

DETAILED DESCRIPTION

Figure 1:
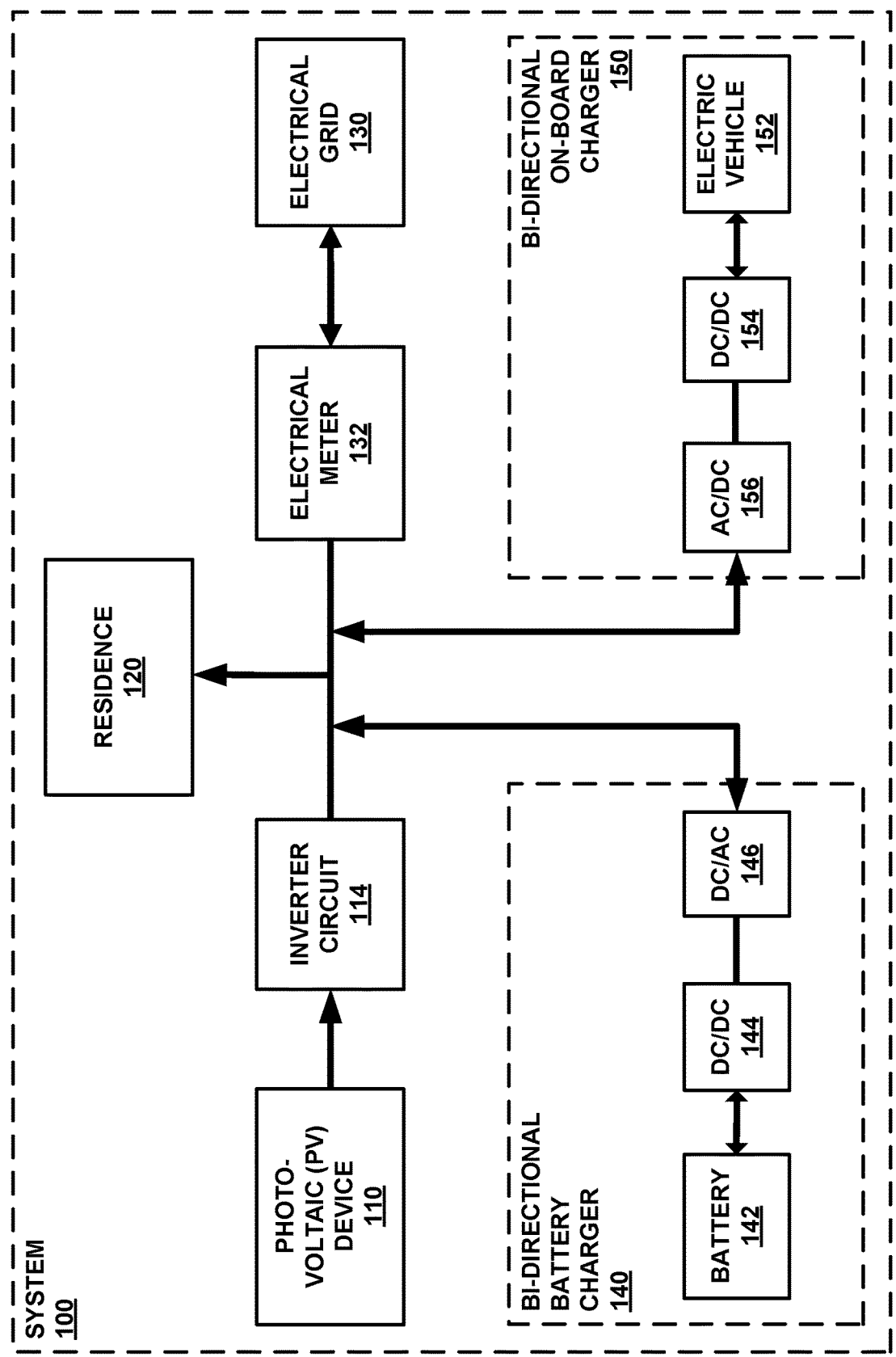
FIG. 1 is a conceptual block diagram of an electrical system including power converters, in accordance with some examples of this disclosure.

This disclosure describes a power converter including two bridge circuits, a transformer, and two inductor-capacitor (LC) tank circuits. A first bridge circuit may be positioned on a first side of the transformer (e.g., the "battery side" of the power converter), which may have a relatively high current. The two tank circuits and a second bridge circuit may be coupled on a second side of the transformer (e.g., the "bus side" of the power converter). Thus, arranging both of the tank circuits on the bus side of the transformer may reduce the power dissipation in the capacitors and/or allow for the use of capacitors with higher equivalent series resistance (ESR).

In some examples, the power converter can have a second transformer coupled between the two LC tank circuits. The second transformer may integrate the magnetic inductors of the two tank circuits to reduce the size and component count of the power converter. In addition, the battery side of the power converter may be expanded by adding a multiple bridge circuits coupled to a multiple transformers. The multiple transformers may be coupled in parallel-series configuration. The multiple bridge circuits may be electrically isolated from the third bridge circuit. The multiple bridge circuits may be galvanic isolated from each other, interfacing multiple batteries, or interfacing multiple groups of battery cells, allowing charge balancing.

This disclosure describes devices, methods, and techniques for controlling a bridge circuit of a power converter in a startup mode and in a steady-state mode. While operating in a first phase of the startup mode, a controller may control the bridge circuit using peak detection and zero-crossing detection. While operating in a second phase of the startup mode after the first phase, the controller may control the bridge circuit using zero-crossing detection. While operating in a third phase of the startup mode after the second phase, the controller may control the bridge circuit using the steady-state pulse-width modulation (PWM) generator but with slowly ramping the reference voltage.

The controller may be configured to receive a signal indicating a current or a voltage in the power converter. Using peak detection, the controller may be configured to toggle a switch in the bridge circuit in response to determining that the signal exceeds a threshold level, such as a predetermined voltage level or a predetermined level of electrical current. Using zero-crossing detection, the controller may be configured to toggle a switch in the bridge circuit in response to determining that the signal has crossed a zero level, which can be a reference voltage level such as ground or a level associated with zero flow of electrical current. Using the steady-state PWM generator, the controller is configured to control the bridge circuit at a switching frequency that is less than the resonant frequency of the power converter such that an inductor current reaches zero before the controller toggles a switch.

The bridge circuit may experience hard commutation, high in-rush currents, high-voltage spikes on the switches of the bridge circuit. By operating in a startup mode as described herein, a controller can reduce or prevent high in-rush currents in the bridge circuit by containing an inductor current within a defined envelope. The techniques of this disclosure may also reduce the hard commutation in the body diodes of the switches in the bridge circuit during the startup mode.

The control technique described herein, which includes a startup mode having three phases, may be especially useful for resonant-mode power converters. In particular, the control technique can be used to control metal-oxide-semiconductor field-effect transistors (MOSFETs) in a bi-directional power converter. However, a controller can use the control technique for any power converter, including uni-directional and bi-directional power converters, power converters including silicon, gallium nitride (GaN), and silicon carbide (SiC), and power converters including MOSFETs, any other FETs, and/or insulated-gate bipolar transistors (IGBTs).

A controller can control the operation of the power converter using the control technique described herein. The controller can also control the operation of the power converter using another control technique, such as a DCM control technique or a continuous conduction mode (CCM) control technique. In examples in which hard commutation during startup is not an issue (e.g., for GaN- and SiC-based topologies), the controller can use a voltage-controlled oscillator (VCO) to implement frequency modulation.

FIG. 1 is a conceptual block diagram of an electrical system 100 including power converters 114, 144, 146, 154, and 156, in accordance with some examples of this disclosure. System 100 includes photovoltaic device 110, inverter circuit 114, residence 120, electrical meter 132, electrical grid 134, bi-directional battery charger 140, and bi-directional on-board charger 150.

In system 100, PV device 110, electrical grid 130, battery 142, and electrical vehicle 152 can act as energy sources. In system 100, residence 120, electrical grid 130, battery 142, and electrical vehicle 152 can act as electrical loads. Thus, power converters 144, 146, 154, and 156 can be configured to operate as bi-directional power converter because electrical grid 130, battery 142, and electrical vehicle 152 can be power sources or electrical loads. The control techniques described in this disclosure may be useful for bi-directional or uni-directional power converters.

PV device 110 generates electrical power based on sunlight. PV device 110 may generate direct-current (DC) electrical power, where the amplitude of the DC voltage is based on the type, material, number, and arrangement of PV cells. Inverter circuit 114 may be configured to convert the DC electrical power generated by PV device 110 to alternating-current (AC) electricity. Inverter circuit 114 may be configured to generate at the frequency, phase, and voltage of the electricity supplied by electrical grid 130. Electrical meter 132 is configured to track the flow of electrical power in both directions (e.g., from grid 130 to residence 120 and devices 142 and 152; and from sources 110, 142, and 152 to grid 130).

Battery 142 and vehicle 152 may be configured to store, consume, and supply DC electricity. For power converters 144 and 154, the "battery side" refers to the side coupled to battery 142 or electric vehicle 152, and the "bus side" refers to the other side of the power converter 144 or 154 that is coupled to power converters 146 and 156.

Power converters 144 and 154 may be configured to convert one form of DC electricity to another form of DC electricity, such as DC electricity with a different voltage level. Power converters 146 and 156 may be configured to convert DC electricity to AC electricity or to convert AC electricity to DC electricity. Power converters 144 and 154 may include a high voltage rectifier circuit, such as in the resonant-mode conversion circuit shown in FIGS. 2-5B.

In accordance with the techniques of this disclosure, a controller may be configured to one or more of power converters 110, 144, 146, 154, and 156 while operating in a startup mode or in a steady-state mode. Battery 142 and/or vehicle 152 can be disconnected and reconnected to system 100. When battery 142 is connected to system 100, the controller may be configured to operate in a startup mode to increase the voltage level at the node between battery 142 and power converter 144 to a steady-state voltage level, such as five, twelve, or forty-eight volts. The controller may also be configured to increase the voltage level at the node between power converters 144 and 146 to a steady-state voltage level, such as two hundred, three hundred, or four hundred volts. By operating in the startup mode as described herein, the controller can increase the voltage level while reducing the likelihood of damage to the switches in power converters 144 and 146.

Moreover, power converter 144 or 154 may include two bridge circuits, a transformer, and two inductor-capacitor (LC) tank circuits. Power converter 144 and/or 154 can use the topology of power converters 200, 300, 400, 500A, or 500B shown in FIGS. 2-5B. The two LC tank circuits and a bridge circuit may be coupled on the bus side of the transformer. The other bridge circuit may be positioned on the battery side of the transformer. This arrangement of components may reduce the power dissipation in the power converter and/or allow for the use of less expensive or smaller components.

Figure 2:
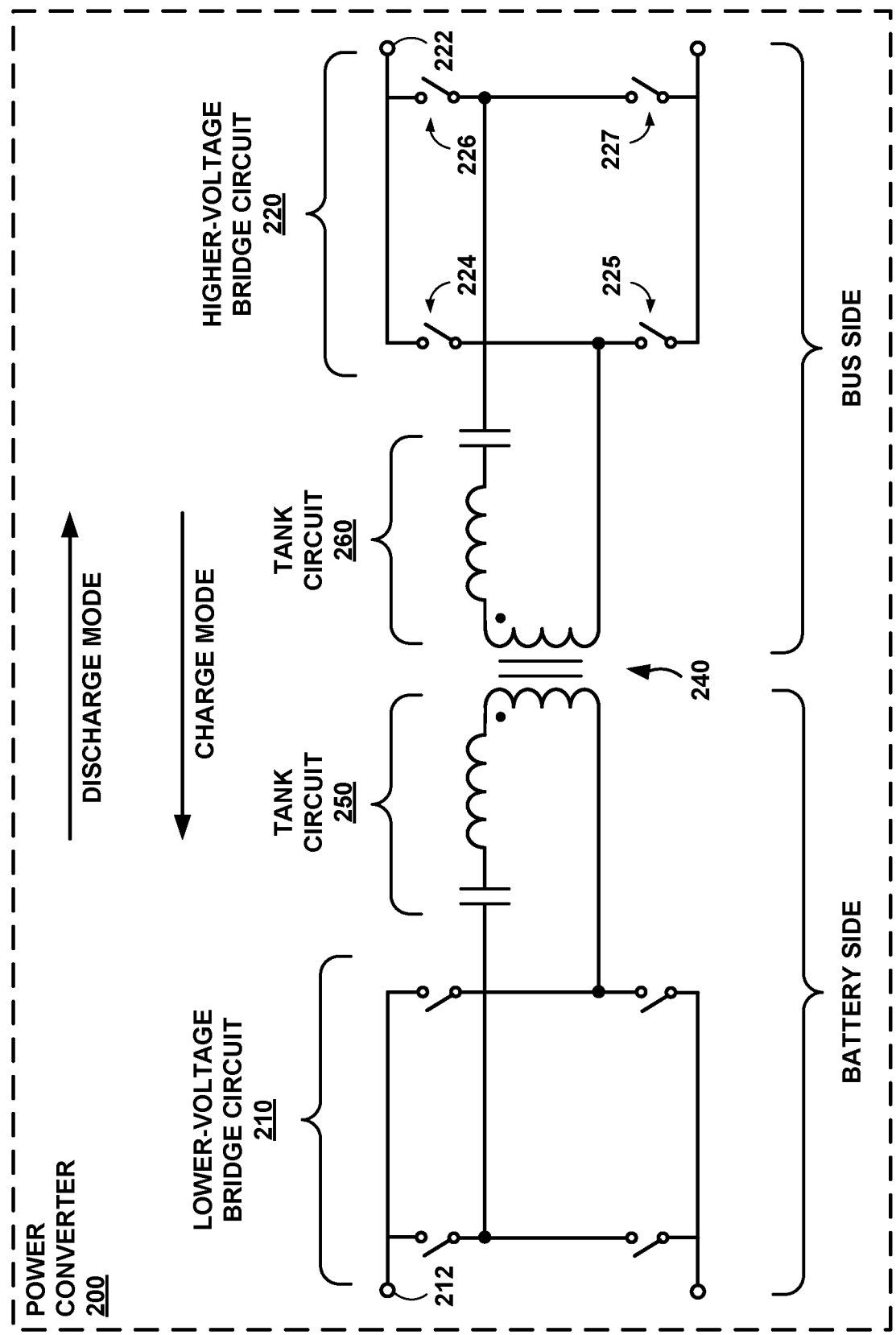
FIG. 2 is a schematic circuit diagrams of a bi-directional power converter including two bridge circuits.

FIG. 2 is a schematic circuit diagrams of a bi-directional power converter 200 including bridge circuits 210 and 220. FIG. 2 depicts each of bridge circuits as including four switches arranged in two half-bridge circuits, although other arrangements are possible, such as any number of half-bridge circuits, an H-bridge circuit, or any other bridge circuit. Power converter 200 also includes a transformer 240 and tank circuits 250 and 260. Power converter 200 may also include one or more controllers configured to control the switches in bridge circuits 210 and 220.

As a bi-directional circuit, power converter 200 is used to charge or discharge low-voltage node 212, which may be coupled to a storage battery, to/from high-voltage node 222. Output node 222 may be coupled to a high-voltage bus with a voltage of three, four, or six hundred volts, for example. Bridge circuit 210 may be referred to as the lower-voltage bridge circuit or the battery-side bridge circuit. Bridge circuit 220 may be referred to as the higher-voltage bridge circuit or the bus-side bridge circuit.

Power converter 200 may comprise a resonant power converter that allows for full soft switching, higher efficiency, and better power density. The topology of power converter 200 may be derived from a uni-directional inductor-inductor-capacitor (LLC) converter by including two LC tank circuits 250 and 260 on both sides of transformer 240 to allow this topology to operate as a bi-directional converter.

Figure 3:
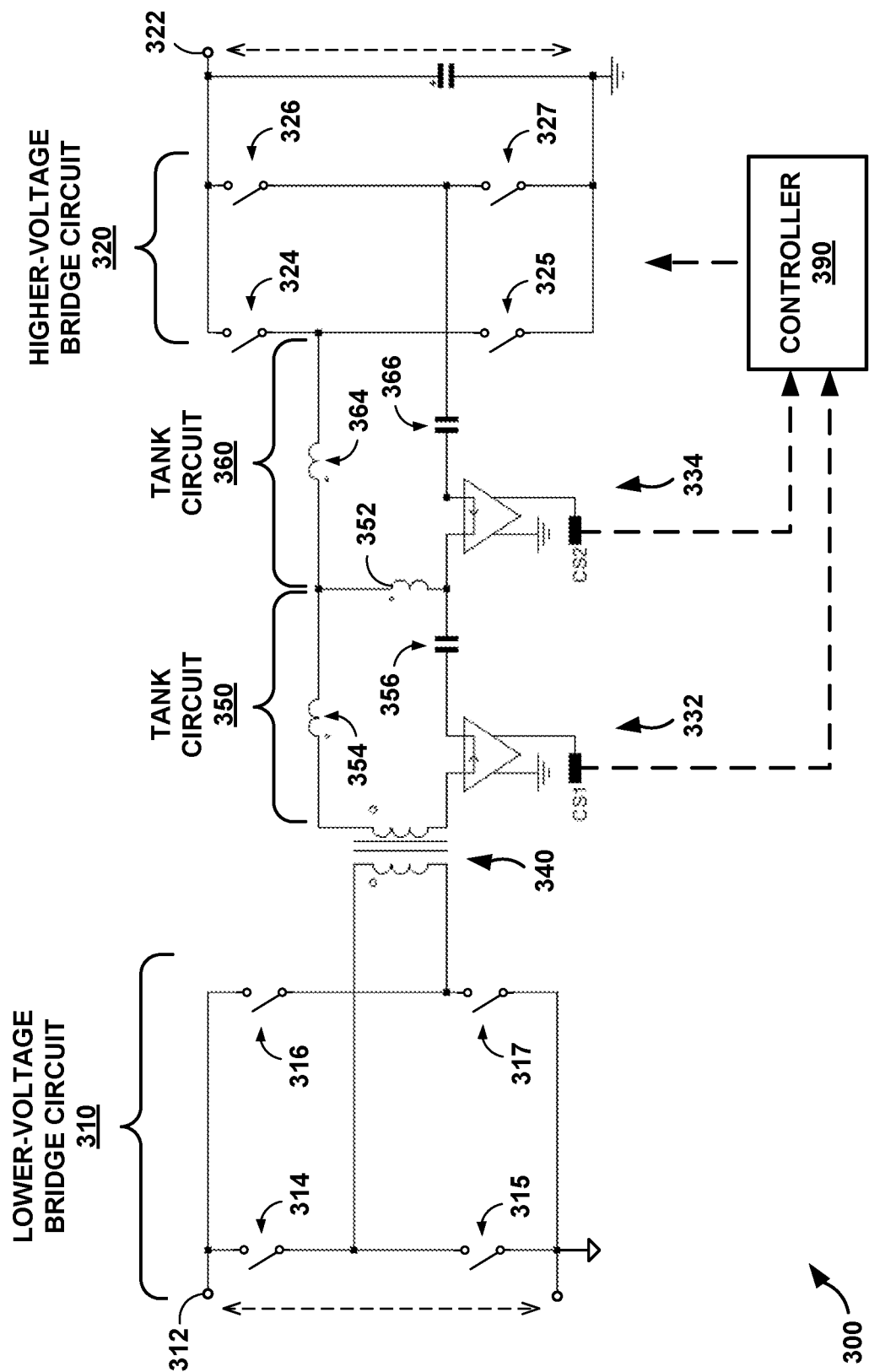
FIGS. 3 and 4 are schematic circuit diagrams of bi-directional power converters including two bridge circuits, in accordance with some examples of this disclosure.
Figure 4:
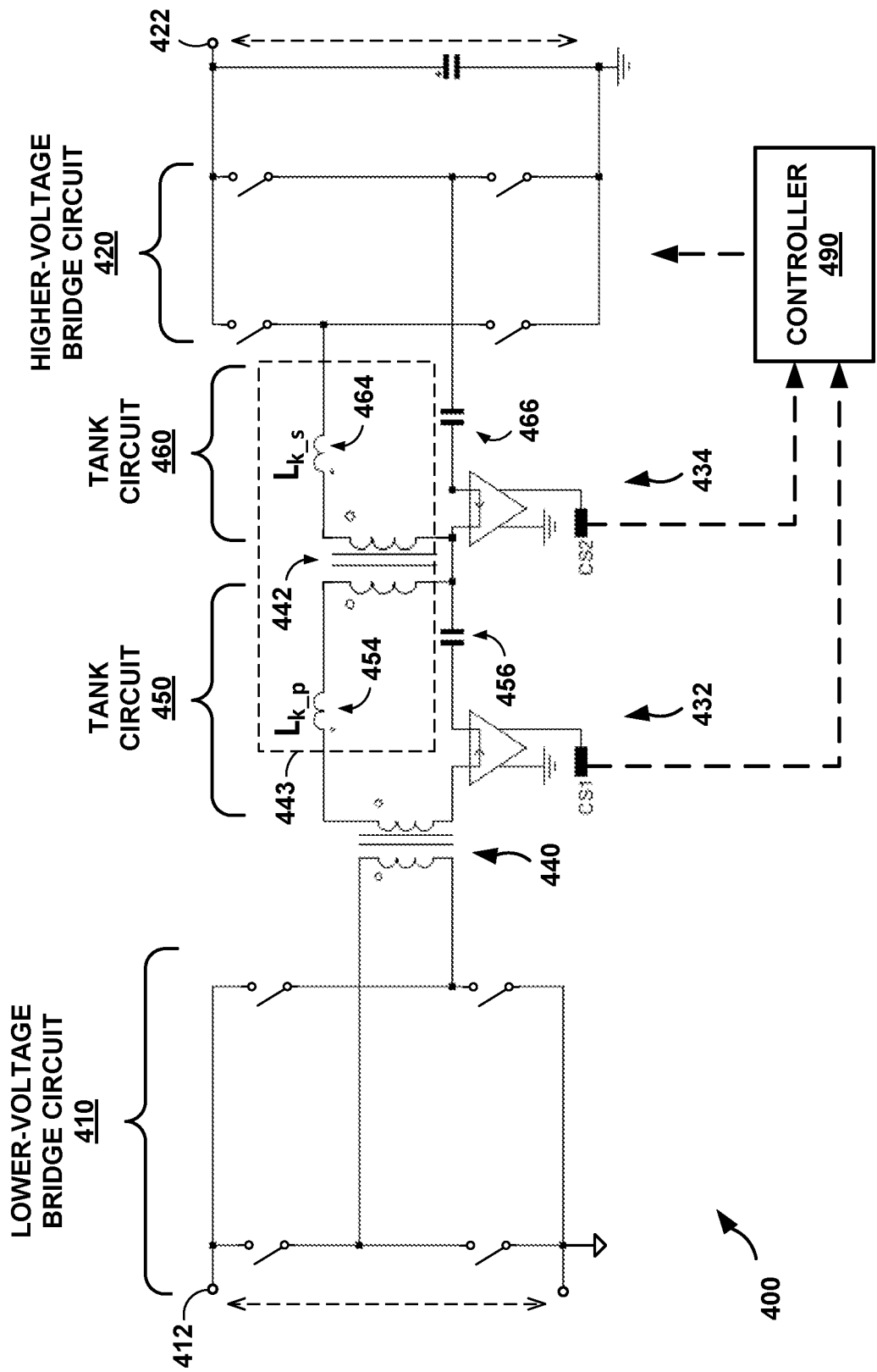
Figure 5A:
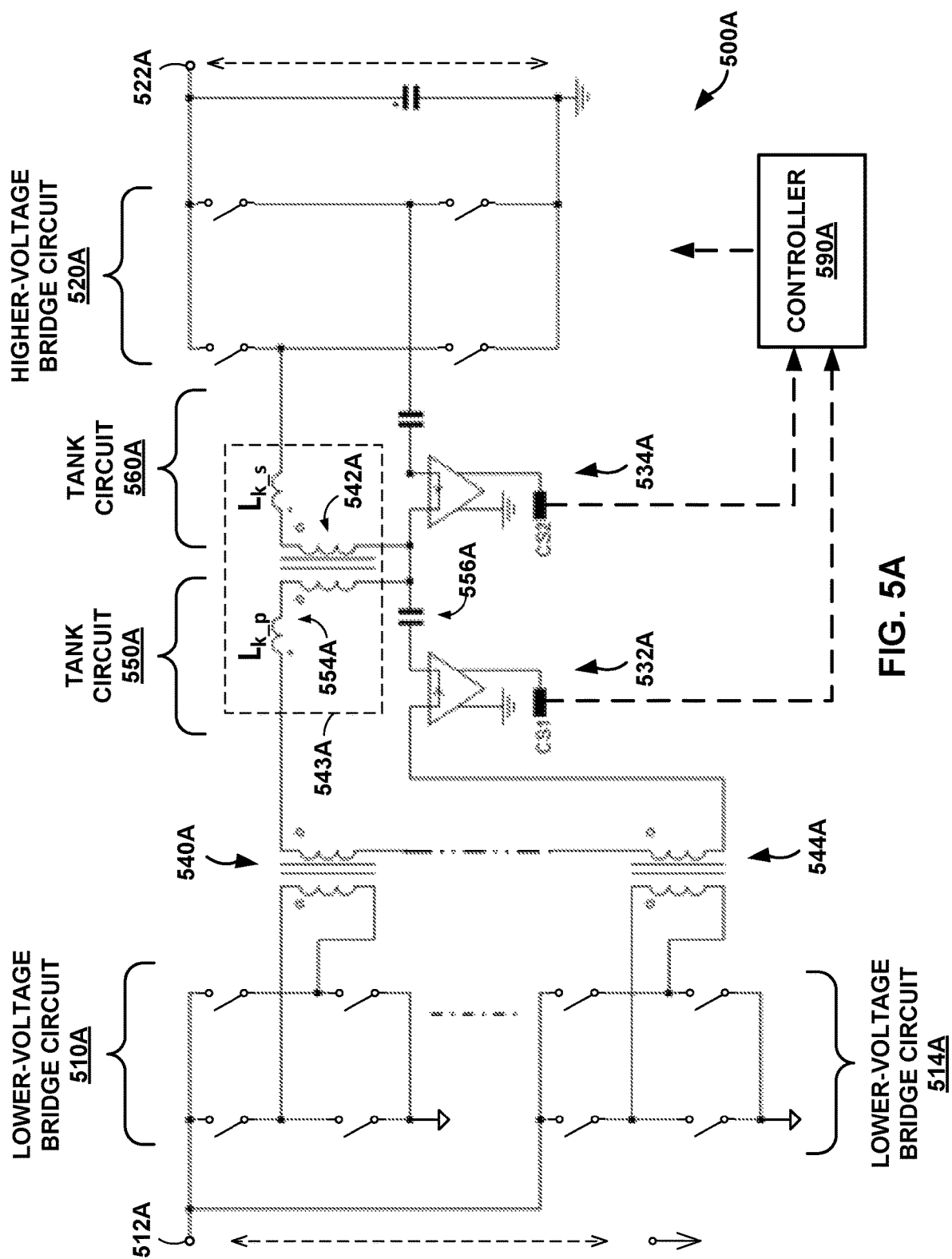
FIGS. 5A and 5B are schematic circuit diagrams of bi-directional power converters including multiple transformers in parallel-series or parallel-parallel configuration, in accordance with some examples of this disclosure.
Figure 5B:
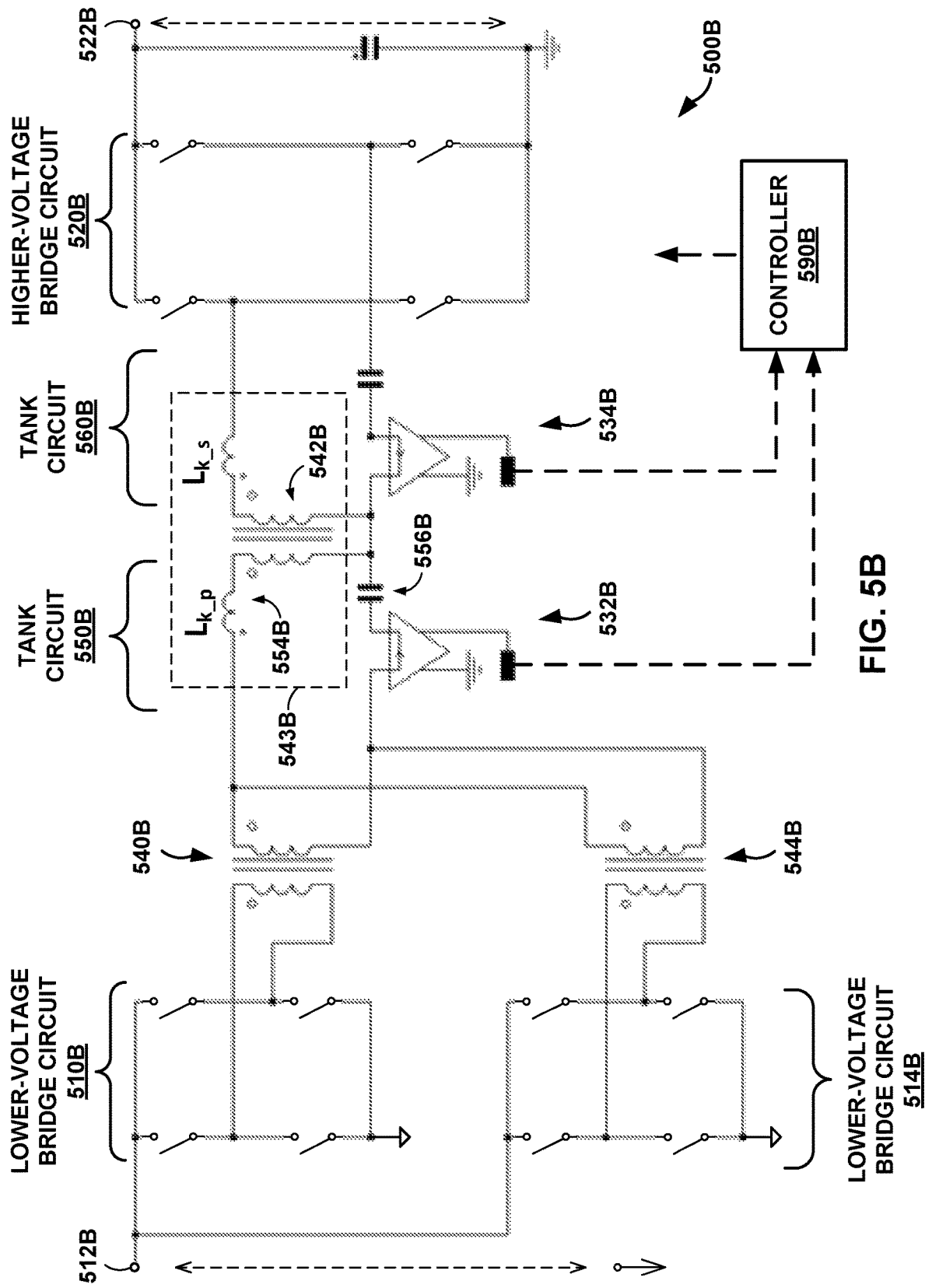

FIGS. 3 and 4 are schematic circuit diagrams of bi-directional power converters 300 and 400 including two bridge circuits, in accordance with some examples of this disclosure. FIGS. 5A and 5B are schematic circuit diagrams of bi-directional power converters including multiple transformers in parallel-series or parallel-parallel configuration, in accordance with some examples of this disclosure.

FIGS. 3-5B show alternative implementations of the topology. In the example of FIG. 3, power converter 300 includes bridge circuit 310 coupled between low-voltage node 312 and transformer 340. Power converter 300 also includes bridge circuit 320 coupled between high-voltage node 322 and tank circuit 360. Both of tank circuits 350 and 360 are coupled on the same side of transformer 340 as bridge circuit 320. Power converter 300 includes controller 390, which can receive a sensed signal from at least one of sensors 332 and 334. Sensors 332 and 334 are configured to sense a current or a voltage through one of tank circuits 350 and 360. The current may flow through tank circuit 350 and/or 360, but this current can also represent the current through bridge circuit 320. Controller 390 may be configured to control the switches of bridge circuit 320 based on the received sensed signal. Even though FIG. 3 shows controller 390 controlling the switches of bridge circuit 320, controller 390 may also be able to control the switches of bridge circuit 310.

Power converter 300 may be used in higher-power applications with a low-voltage battery coupled to low-voltage node 312. In examples in which tank circuit 350 is coupled to bridge circuit 310, the root-mean square (RMS) current in tank circuit 350 can be high. Thus, it may not be cost effective to use a low-ESR capacitors that can handle the high RMS current without impacting efficiency and cost. To overcome this challenge, tank circuit 350 can be transferred to the bus side by scaling the values of the inductor(s) and capacitor(s) by the turn ratio of transformer 340. In addition, inductor 352 between tank circuits 350 and 360 can act as a substitute for the magnetizing inductor of transformer 240 shown in FIG. 2. The gain curves shown in FIG. 7 may apply to power converter 300, depending the capacitances and inductances in each circuit.

Power converter 300 may include sensors 332 and 334 for sensing signals through tank circuits 350 and 360. Sensors 332 and 334 may be configured to deliver the sensed signals to a controller. Sensor 332 can sense a current or a voltage through tank circuit 350, and sensor 334 can sense a current or a voltage through tank circuit 360. In the example of FIG. 3, sensor 332 senses the electrical current through transformer 340 and through the capacitor of tank circuit 350, and sensor 334 senses the electrical current through the capacitor of tank circuit 360. The controller may be configured to control the switches of bridge circuit 320 based on the sensed signal(s) received from sensors 332 and 334. In some examples, capacitors 356 and 366 may have different positions in power converter 300 in addition to or in alternative to the positions shown in FIG. 3. For example, capacitor 356 can be connected in series with inductor 356, and capacitor 366 can be connected in series with inductor 364.

In the example shown in FIG. 4, power converter 400 includes bridge circuit 410 coupled between low-voltage node 412 and transformer 440. Power converter 400 also includes bridge circuit 420 coupled between high-voltage node 422 and tank circuit 450. Both of tank circuits 450 and 460 are coupled on the same side of transformer 440 as bridge circuit 420. Controller 490 can receive a sensed signal from at least one of sensors 432 and 434. Sensors 432 and 434 are configured to sense a current or a voltage through one of tank circuits 450 and 460. The current may flow through tank circuit 450 and/or 460, but this current can also represent the current through bridge circuit 420. Controller 490 may be configured to control the switches of bridge circuit 420 based on the received sensed signal. Even though FIG. 4 shows controller 490 controlling the switches of bridge circuit 420, controller 490 may also be able to control the switches of bridge circuit 410. In some examples, capacitors 456 and 466 may have different positions in power converter 400 in addition to or in alternative to the positions shown in FIG. 4. For example, capacitor 456 can be connected in series with inductor 456, and capacitor 466 can be connected in series with inductor 464.

Power converter 400 shown in FIG. 4 may be considered alternative implementations of the topology of power converter 300 shown in FIG. 3. As compared to power converter 300 shown in FIG. 3, the three magnetic inductors in tank circuits 350 and 360 are combined into one magnetic structure: transformer 442 shown in FIG. 4. Thus, transformer 442 may have an effect on tank circuits 450 and 460 that is similar to the effect of inductor 352 on tank circuits 350 and 360. Furthermore, inductors 454 and 464 may be leakage inductors (Lk), rather than discrete inductors, that are integrated in transformer 442 as single structure 443.

A first side of transformer 442 may include or operate as an inductance of tank circuit 450. A second side of transformer 442 may include or operate as an inductance of tank circuit 460. Each of inductor 454 and capacitor 456 may be coupled between the second side of transformer 440 and the first side of transformer 442. Inductors 454 and 464 may be leakage inductors of transformer 442, rather than discrete inductors. Each of inductor 464 and capacitor 466 may be coupled between the second side of transformer 442 and bridge circuit 420.

The circuit topology of power converter 400 may have a smaller size and lower component count, as compared to power converter 300. Transformer 442 may be a unity-turns-ratio transformer. In other words, transformer 442 may have a turns ratio of one. The leakage and magnetizing inductors of transformer 442 can work in either direction of power flow (e.g., charge or discharge mode). Capacitors 356, 366, 456, and/or 466 shown in FIGS. 3 and 4 can be positioned at different positions, such as in series with inductors 354, 364, 454, and/or 464.

In the example shown in FIG. 5A, power converter 500A includes at least two lower-voltage bridge circuits 510A and 514A. Bridge circuit 510A is coupled between node 512A and transformer 540A, and bridge circuit 514A is coupled between node 512A and transformer 544A. Power converter 500A also includes bridge circuit 520A coupled between high-voltage node 522A and tank circuit 560A. Both of tank circuits 550A and 560A are coupled on the same side of transformers 540A and 544A as bridge circuit 520A. Controller 590A can receive a sensed signal from at least one of sensors 532A and 534A. Sensors 532A and 534A are configured to sense a current or a voltage through one of tank circuits 550A and 560A. The current may flow through tank circuit 550A and/or 560A, but this current can also represent the current through bridge circuit 520A. Controller 590A may be configured to control the switches of bridge circuit 520A based on the received sensed signal. Even though FIG. 5A shows controller 590A controlling the switches of bridge circuit 520A, controller 590A may also be able to control the switches of bridge circuit 510A.

A first side of transformer 540A is coupled to bridge circuit 510A, and a second side of transformer 540A is coupled to tank circuit 550A. A first side of transformer 544A is coupled to bridge circuit 514A, and a second side of transformer 544A is coupled to tank circuit 550A. In the example of FIG. 5A, the second side of transformer 540A is coupled in series with the second side of transformer 544A. Viewed from node 512A, bridge circuits 510A and 514A are connected in parallel. FIG. 5A shows the upper node on the second side of transformer 540A may be coupled to a first node of tank circuit 550A. Transformer 540A may be coupled to inductor 554A through the first node of tank circuit 550A. Inductor 554A may be a leakage inductor, rather than discrete inductor, that is integrated in transformer 542A as single structure 543A. The lower node on the second side of transformer 540A may be coupled to the upper node on the second side of transformer 544A. The lower node on the second side of transformer 544A may be coupled to the second node of tank circuit 550A. Transformer 544A may be coupled to capacitor 556A through the second node of tank circuit 550A.

The usage of a series-parallel transformer configuration shown in FIG. 5A or a parallel-parallel configuration shown in FIG. 5B can split the current and thermal stress between two bridge circuits 510A and 514A on the low-voltage side. Multiple resonant tanks may not have perfectly matched values, and a controller cannot necessarily synchronously drive multiple resonant tanks with a single control frequency. For this reason, each resonant circuit and bridge circuit is driven separately or asynchronously. However, power converter 500A overcomes this challenge because transformers 540A and 544A are decoupled from tank circuits 550A and 560A, allowing multiple transformers and bridge circuits. Transformers 540A and 544A and bridge circuits 510A and 514A may allow for splitting the higher current on the lower-voltage side, while maintaining a single resonant tank (e.g., tank circuits 550A and 560A) on the higher-voltage side for simple frequency regulation and control.

Multiple-transformer configurations are not simple in a resonant circuit such as power converter 200 shown in FIG. 2 because transformer 240 is part of the resonant tank, hence using multiple transformers means having multiple resonant tanks. In contrast, power converter 500A has both of tank circuits 550A and 560A coupled to the higher-voltage side of transformer 540A. Thus, an additional benefit of having both of tank circuits 550A and 560A on one side of transformer is that power converter 500A can include more than one lower-voltage bridge circuit.

In some examples, the second side of transformer 540A is coupled in parallel with the second side of transformer 544A. For a parallel connection, the upper node on the second side of transformer 540A is coupled to the upper node on the second side of transformer 544A, and both upper nodes are coupled to inductor 554A of tank circuit 550A. For a parallel connection, the lower node on the second side of transformer 540A is coupled to the lower node on the second side of transformer 544A, and both lower nodes are coupled to capacitor 556A of tank circuit 550A. The lower nodes may be coupled to capacitor 556A through sensor 532A.

In the example shown in FIG. 5B, power converter 500B includes at least two lower-voltage bridge circuits 510B and 514B. Bridge circuit 510B is coupled between node 512B and transformer 540B, and bridge circuit 514B is coupled between node 512B and transformer 544B. Power converter 500B also includes bridge circuit 520B coupled between high-voltage node 522B and tank circuit 560B. Both of tank circuits 550B and 560B are coupled on the same side of transformers 540B and 544B as bridge circuit 520B. Controller 590B can receive a sensed signal from at least one of sensors 532B and 534B. Sensors 532B and 534B are configured to sense a current or a voltage through one of tank circuits 550B and 560B. The current may flow through tank circuit 550B and/or 560B, but this current can also represent the current through bridge circuit 520B. Controller 590B may be configured to control the switches of bridge circuit 520B based on the received sensed signal.

A first side of transformer 540B is coupled to bridge circuit 510B, and a second side of transformer 540B is coupled to tank circuit 550B. A first side of transformer 544B is coupled to bridge circuit 514B, and a second side of transformer 544B is coupled to tank circuit 550B. In the example of FIG. 5B, the second side of transformer 540B is coupled in parallel with the second side of transformer 544B. Viewed from node 512B, bridge circuits 510B and 514B are connected in parallel. FIG. 5B shows the upper node on the second side of transformer 540B may be coupled to the upper node on the second side of transformer 544B and a first node of tank circuit 550B. Transformers 540B and 544B may be coupled to transformer 542B through the first node of tank circuit 550B. Inductor 554B may be a leakage inductor, rather than discrete inductor, that is integrated in transformer 543B as single structure 543B. The lower node on the second side of transformer 540B may be coupled to the lower node on the second side of transformer 544B and the second node of tank circuit 550B. Transformers 540B and 544B may be coupled to capacitor 556B through the second node of tank circuit 550B.

FIGS. 6A-6C are graphs of operation in a discontinuous-current mode, a boundary mode, a continuous-current mode, in accordance with some examples of this disclosure. FIGS. 6A-6C show the current waveforms in the rectifier side for the three modes of operations. FIG. 6A depicts operation below the resonant frequency in DCM, FIG. 6B depicts operation at the resonant frequency in boundary mode, and FIG. 6C depicts operation in continuous conduction mode (CCM), in accordance with some examples of this disclosure. The rectifier side can be either the bus-side or the battery-side depending on the energy flow direction (e.g., charge mode or discharge mode).

The rectifier current shown in FIG. 6A is discontinuous in below-resonance mode because the current reaches zero before the next switching instance. Thus, operation in below-resonance mode may not have any diode hard commutation issues. However, in the above-resonance mode shown in FIG. 6C, the rectifier is switched off while conducting current, therefore hard commutation of the rectifier is a reliability concern. For the at-resonance mode shown in FIG. 6B, the rectifier is switched off at the instant the current reaches zero.

In some examples, switches 324 and 327 are turned on during time periods 600A, 600B, and 600C, and switches 325 and 326 are turned on during time periods 610A, 610B, and 610C. An electrical current may flow through tank circuit 360 in a first direction when switches 324 and 327 are turned on and switches 325 and 326 are turned off. An electrical current may flow through tank circuit 360 in a second direction when switches 324 and 327 are turned off and switches 325 and 326 turned on, where the second direction is opposite of the first direction.

Figure 7:
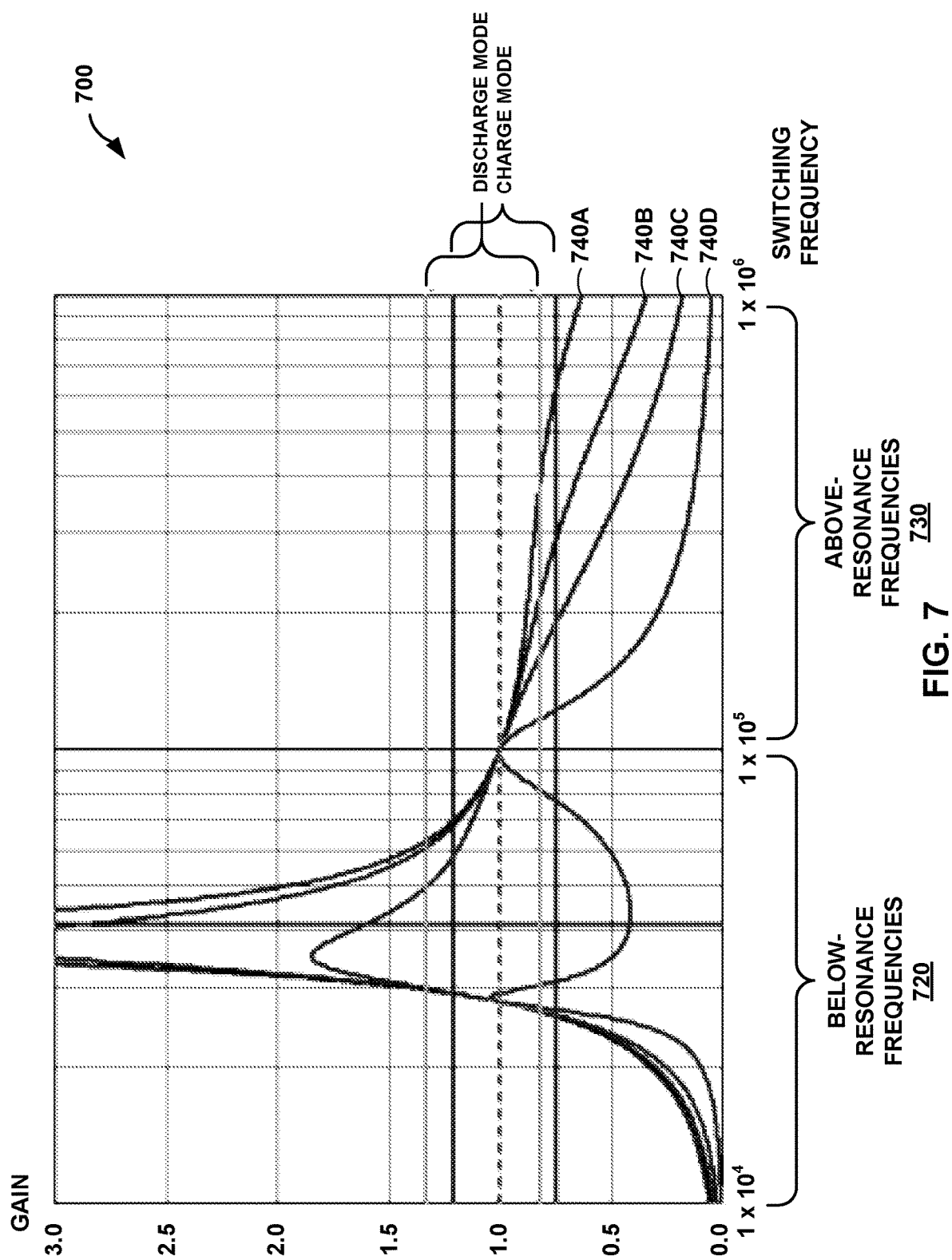
FIG. 7 is a plot of gain and switching frequency for a bi-directional resonant power converter, showing regulation regions/operations in a charge mode and a discharge mode, in accordance with some examples of this disclosure.

FIG. 7 is a plot of gain and switching frequency for a bi-directional resonant power converter, in accordance with some examples of this disclosure. Graph 700—includes a resonant frequency of approximately one hundred kilohertz, below-resonance frequencies 720, and above-resonance frequencies 730. Lines 740A-740D show the relationship between gain and switching frequency for four quality factors. Example regulation curves 740A-740D show the operation below and above the resonant frequency. Operating at frequencies above the resonant frequency implies operating the high voltage switches during discharge mode in continuous conduction mode, where the body diodes of the MOSFETs may have hard commutation. For that reason other switch technologies with low or no reverse recovery can be used, such as IGBTs, GaN and SiC. Additional example details of the operation of power converters may be found in Application Note AN 2012-09, "Resonant LLC Converter: Operation and Design," by Sam Abdel-Rahman, September 2012, which is incorporated herein by reference in its entirety.

The circuit topology of power converters 200, 300, 400, 500A, and 500B shown in FIG. 2-5B may safely operate with silicon super junction MOSFETs in bi-directional converters as rectifiers, with special design and control consideration. The transformer and tank circuits can be designed to keep the frequency regulation range during the discharge mode in the below-resonance mode to avoid hard commutation in steady-state operation as shown in FIG. 8B.

Figure 8A:
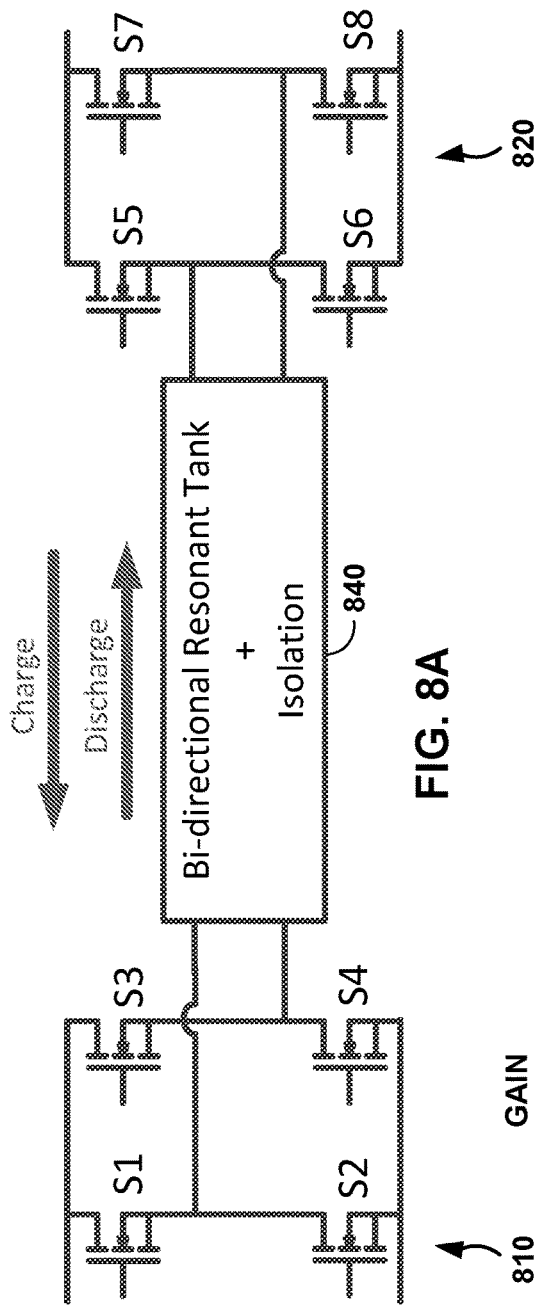
FIG. 8A is a circuit diagram of a bi-directional power converter with MOSFET high voltages switches, in accordance with some examples of this disclosure.
Figure 8B:
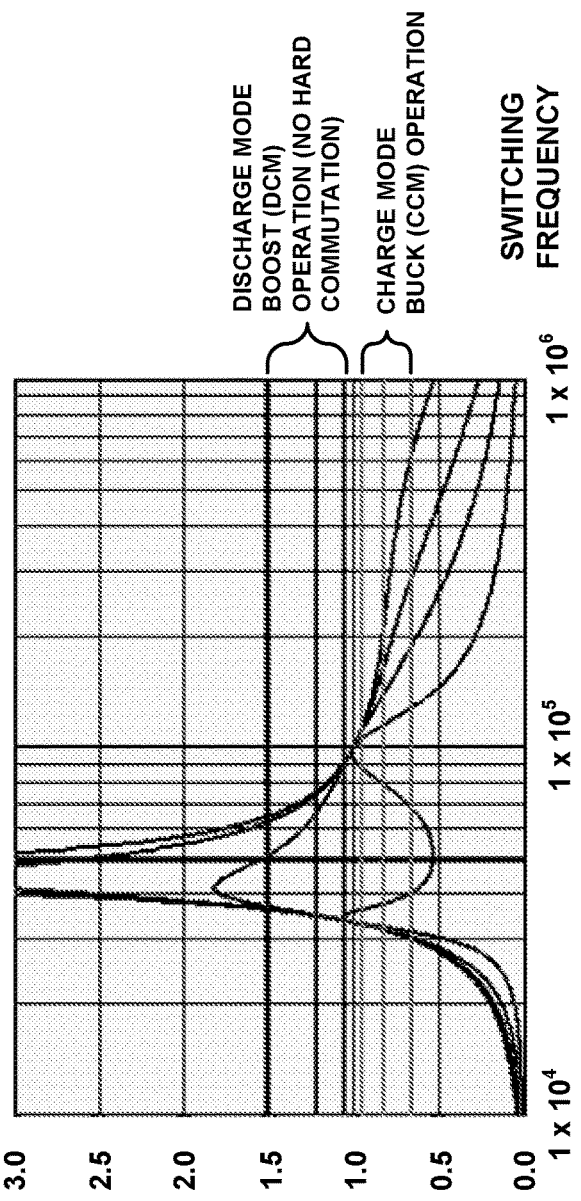
FIG. 8B is a plot of gain and switching frequency, showing regulation regions/operations in charge and discharge modes, in accordance with some examples of this disclosure.

FIG. 8A is a circuit diagram of a bi-directional power converter with MOSFET high voltages switches, in accordance with some examples of this disclosure. FIG. 8B is a plot of gain and switching frequency, showing regulation regions/operations in charge and discharge modes, in accordance with some examples of this disclosure. At switching frequencies below the resonant frequency, the tank circuit will have a boost gain of greater than one, and the switches can operate in DCM with no hard commutation on the antiparallel body diode. During the charge mode, the power converter may support a gain range that is the reciprocal of the discharge gain range. The frequency regulation range may be in the above-resonance mode for the charge mode, where the resonant tank circuit has a buck gain of less than one. In above-resonance mode, the low-voltage switches in bridge circuit 820 may operate in CCM with hard commutation on the antiparallel body diodes. In examples in which the voltage level across bridge circuit 810 is relatively low (e.g., 48 volts), the hard commutation on the low-voltage switches may not be a concern because low/medium voltage FETs can have robust body diodes and low reverse recovery charge.

CCM operation or above-resonance mode may not be allowed in both charge and discharge modes for applications with high-voltage batteries (e.g., 350 volts). In examples in which a high-voltage battery is coupled to bridge circuit 810, the switches in lower-voltage bridge circuit 810 may be operating under high voltages. Thus, a regulation scheme designed for a low-voltage battery may be modified to fit the high-voltage application.

Figures 9A, 9B:
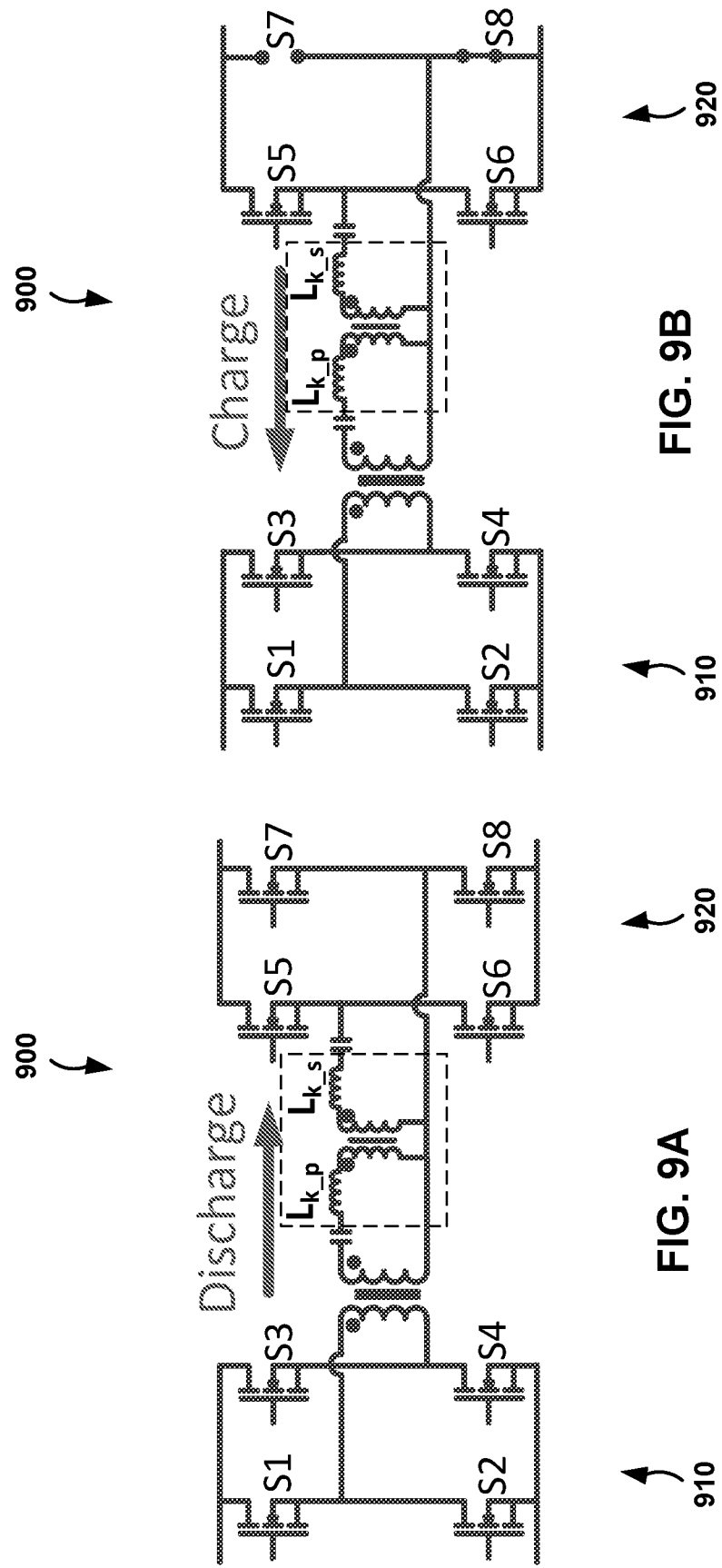
FIGS. 9A and 9B are circuit diagrams of bi-directional power converters with MOSFET high voltages switches, showing switching the bridge from a full-bridge in discharge mode to a half-bridge in charge mode, in accordance with some examples of this disclosure.

Alternatively, the above-resonance mode can be folded back into the below-resonance mode by operating bridge circuit 820 as a half-bridge instead of a full-bridge only in charge mode. FIGS. 9A and 9B are circuit diagrams of bi-directional power converters with MOSFET high voltages switches, showing switching the bridge from a full-bridge in discharge mode to a half-bridge in charge mode, in accordance with some examples of this disclosure. As shown in FIG. 9B, a controller can close low-side switch S8 of bridge circuit 920 and open high-side switch S7 to open bridge circuit 920 as a half-bridge circuit. The controller may be configured to keep a static voltage on one of the bridges, either at ground reference or at the bus voltage, by turning on a first switch and turning off a second switch. Operating bridge circuit 920 as a half-bridge circuit may apply a gain factor of 0.5 that causes a tank circuit of power converter 900 to double its gain, consequently operating in the boost mode below resonance. The inductor current may be DCM, and bridge circuit 920 may not experience any hard commutation under these conditions, as shown in FIG. 9B.

Figure 10A:
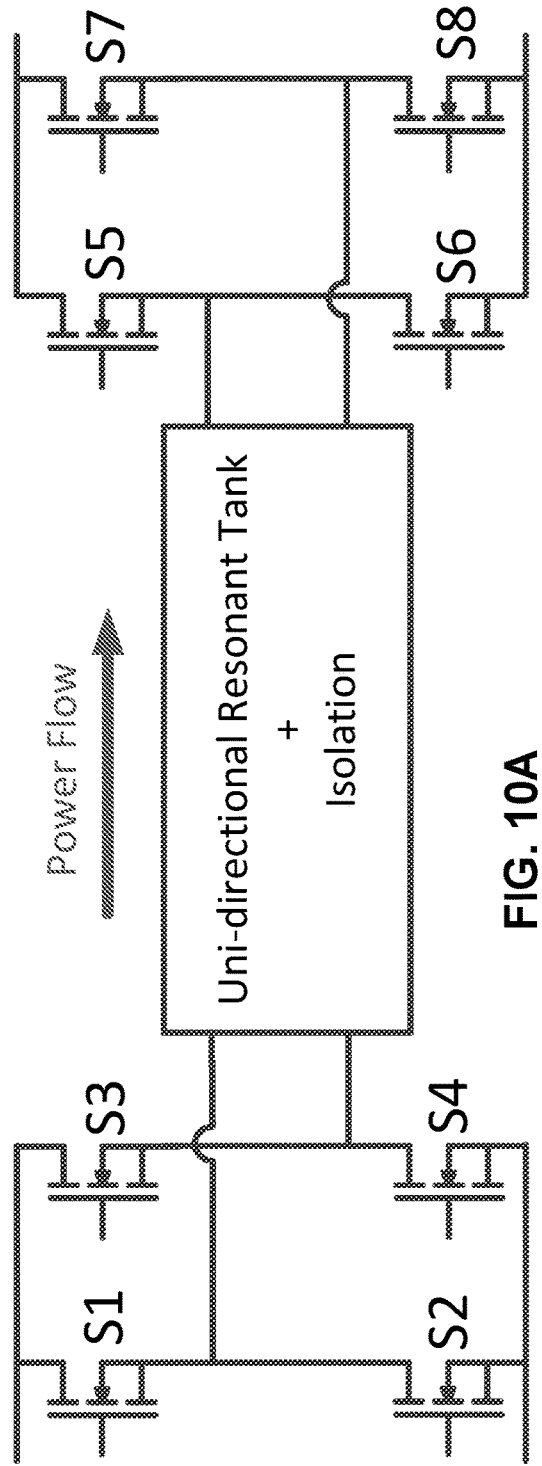
FIG. 10A is a circuit diagram of a uni-directional power converter with MOSFET high voltage rectifiers, in accordance with some examples of this disclosure.
Figure 10B:
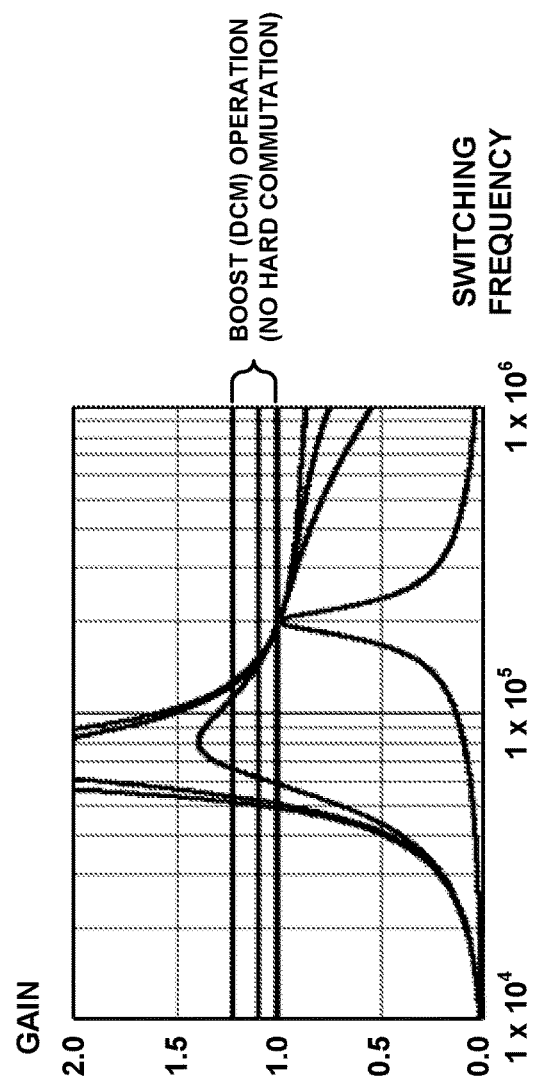
FIG. 10B is a plot of gain and switching frequency, showing regulation regions/operations, in accordance with some examples of this disclosure.

FIG. 10A is a circuit diagram of a uni-directional power converter with MOSFET high voltage rectifiers, in accordance with some examples of this disclosure. FIG. 10B is a plot of gain and switching frequency, showing regulation regions/operations, in accordance with some examples of this disclosure. Uni-directional power converters with high output voltages can safely operate with silicon super junction MOSFETs as rectifiers, with special design and control consideration. Transformer and tank circuits can be designed to keep the frequency regulation range in the below-resonance mode to avoid hard commutation in steady state operation as shown in FIG. 10B.

A controller of this disclosure may implement a control technique to prevent hard commutation during start-up operation, that uses peak current detection and a zero crossing control approach on the inductor current on the high-voltage bus side of a power converter (e.g., the current in tank circuit 360, 460, 560A, or 560B). The startup mode control technique may reduce the hard commutation switching cycles by using a lower switching frequency in below-resonance mode. The startup mode control technique may also limit the startup inrush current. The startup mode can include a third phase in which the controller operates at below-resonance frequencies.

A controller configured to control one of power converters 200, 300, 400, 500A, 500B, 1100, and 1200 shown in FIGS. 2-5B, 11, and 12 can avoid hard commutation on the switches of one of higher-voltage bridge circuits 220, 320, 420, 520A, 520B, 1120 and 1220 shown in FIGS. 2-5B, 11, and 12 by operating in below-resonance mode. The controller may use below-resonance mode in steady-state operation, but the operation may be different for several switching cycles during a startup mode until the voltage level reaches a steady-state point. The controller may use a special control technique for the startup mode to limit the high in-rush resonant current and reduce diode hard commutation during the abnormal conditions that may occur during the startup mode.

During the startup mode, the resonant and output capacitors are not charged to their steady-state voltage level, which may create an imbalanced voltage on the inductor during a switching cycle. Thus, the steady state control of a complimentary fifty-percent duty cycle for the bridge switches will cause a high inrush inductor current. Moreover, the operation of the switches will not be contained in the DCM operation as needed to avoid hard commutation.

The controller may use peak current and zero crossing control during the startup mode. The controller may detect peaks and zero crossings for the inductor current on the high-voltage bus side. Thus, the controller may be configured to toggle or change the state of the active switches every time the sensed current reaches a peak or crossing a zero level. Responsive to detecting a zero crossing, the controller can turn off the active switches. The startup operating mode can reduce the hard commutation switching cycles and reduce the startup inrush current.

In some examples, the startup operating mode may have three phases. In the first phase of the startup mode, the controller can use peak current detection and zero crossing detection. In addition, the controller can cause the switches in the active bridge to operate in a half-bridge configuration. By operating the switches as a half-bridge, the resonant inductor current may remain within a defined envelope to limit the high inrush current. In the example of power converter 300 shown in FIG. 3, controller 390 can operate higher-voltage bridge circuit 320 as a half-bridge circuit by turning off switch 326 and turning on switch 327. Controller 390 can turn off switch 326 for more than one switching cycle and turn on switch 327 for more than one switching cycle. In some examples, controller 390 may turn off switch 326 and turn on switch 327 to operate in half-bridge mode for all of the first and second phase.

While operating higher-voltage bridge circuit 320 as a half-bridge circuit, controller 390 may toggle switches 324 and 325 on and off during the switching cycles of the first and second phases. Thus, while operating in half-bridge mode, switches 324 and 325 may operate as a half-bridge circuit. While operating in half-bridge mode, one of switches 326 and 327 may operate as a closed circuit, and the other of switches 326 and 327 may operate as an open circuit. Even though switches 326 and 327 are arranged as a half-bridge circuit (e.g., a load terminal of switch 326 is coupled to a load terminal of switch 327), switch 326 or 327 can operate as a short circuit with node 322 or with ground.

Figure 11:
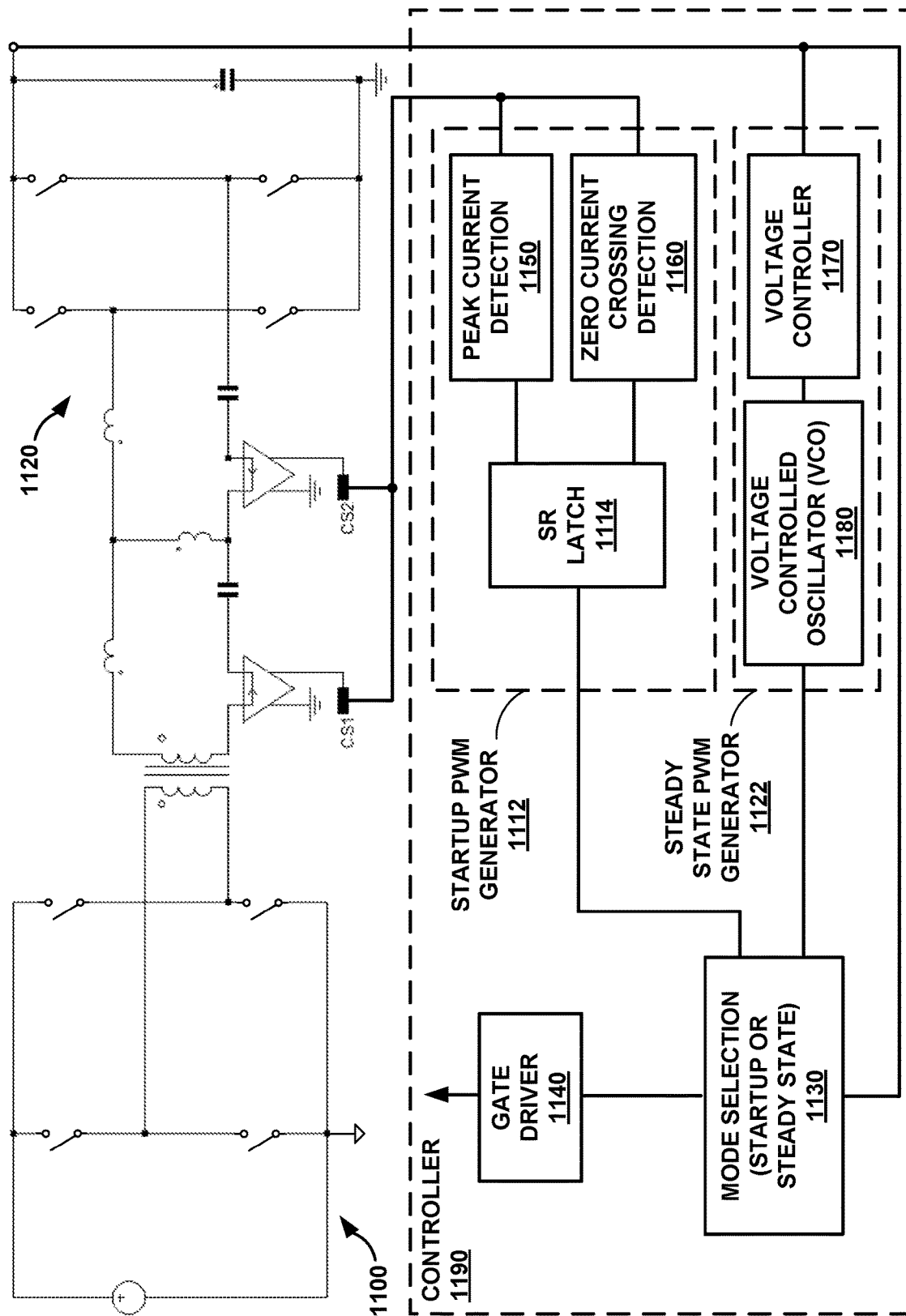
FIG. 11 is a conceptual block diagram of a controller for a bi-directional power converter, in accordance with some examples of this disclosure.
Figure 12:
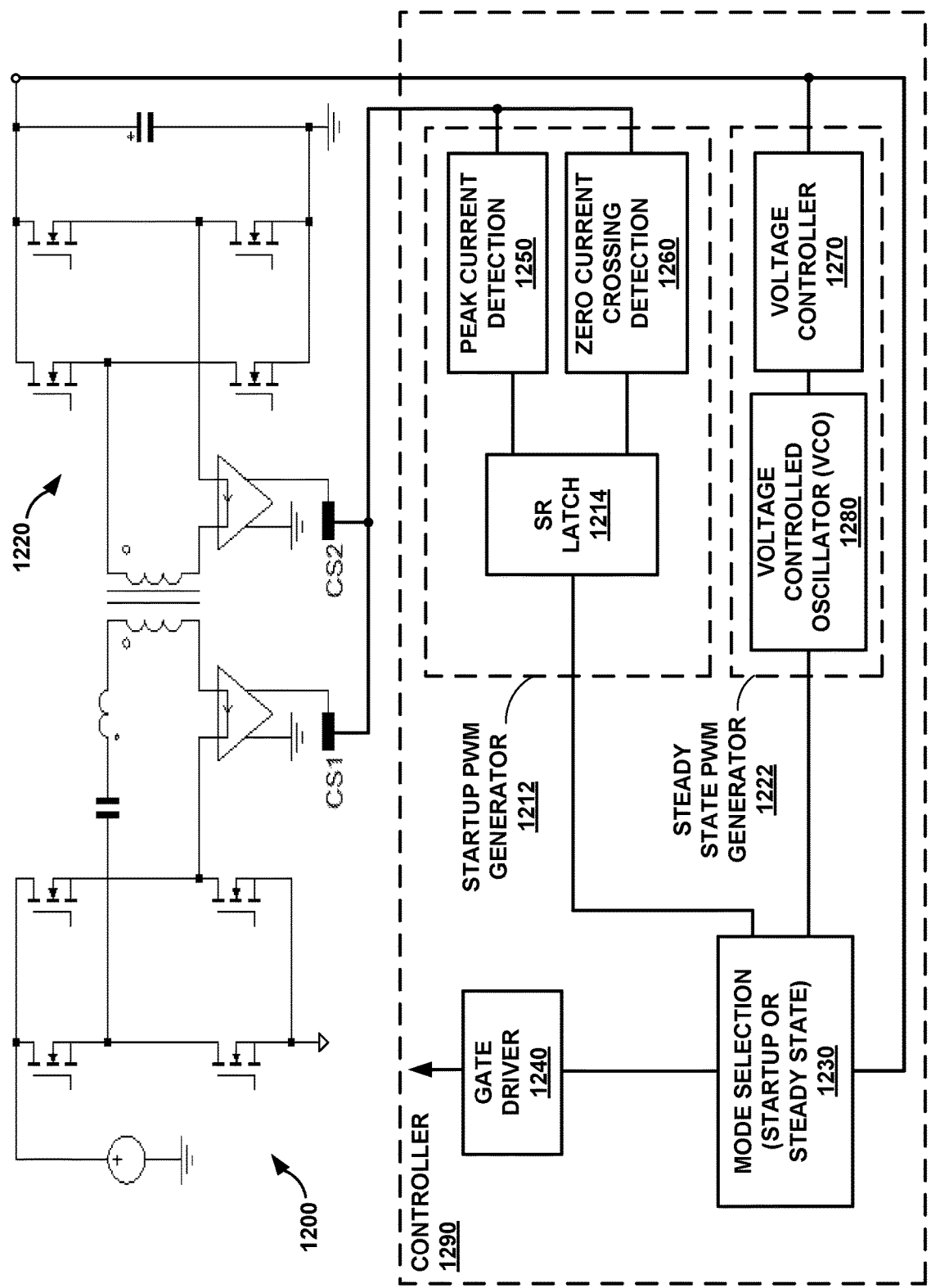
FIG. 12 is a conceptual block diagram of a controller for a uni-directional power converter, in accordance with some examples of this disclosure.

FIGS. 11 and 12 are conceptual block diagrams of controllers 1190 and 1290, for controlling bi-directional and uni-directional converters, respectively, in accordance with some examples of this disclosure. Controller 1190 includes two PWM generation blocks: startup PWM generator 1112 and steady state PWM generator 1122. Mode selection block 1130 passes the output of startup PWM generator 1112 to gate driver 1140 only during the startup mode until the output voltage of bridge circuit 1120 reaches a defined threshold level. The first phase and/or the second phase of the startup mode will run until the output voltage reaches the defined threshold level. When controller 1190 enters the third phase, mode selection 1130 passes the output of steady state PWM generator 1122 to gate driver 1140. Steady state PWM generator 1122 can slowly ramp-up the reference voltage. The soft start (e.g., the startup mode) ends when the third phase ends when the reference voltage reaches the target reference voltage.

Controller 1290 includes startup PWM generator 1212 and steady state PWM generator 1222. Mode selection block 1230 passes the output of startup PWM generator 1212 to gate driver 1240 only during the startup mode until the output voltage of bridge circuit 1220 reaches a defined threshold level. The first phase and/or the second phase of the startup mode will run until the output voltage reaches the defined threshold level. When controller 1290 enters the third phase, mode selection 1230 passes the output of steady state PWM generator 1222 to gate driver 1240. Steady state PWM generator 1222 can slowly ramp-up the reference voltage. The soft start (e.g., the startup mode) ends when the third phase ends when the reference voltage reaches the target reference voltage.

Figure 13:
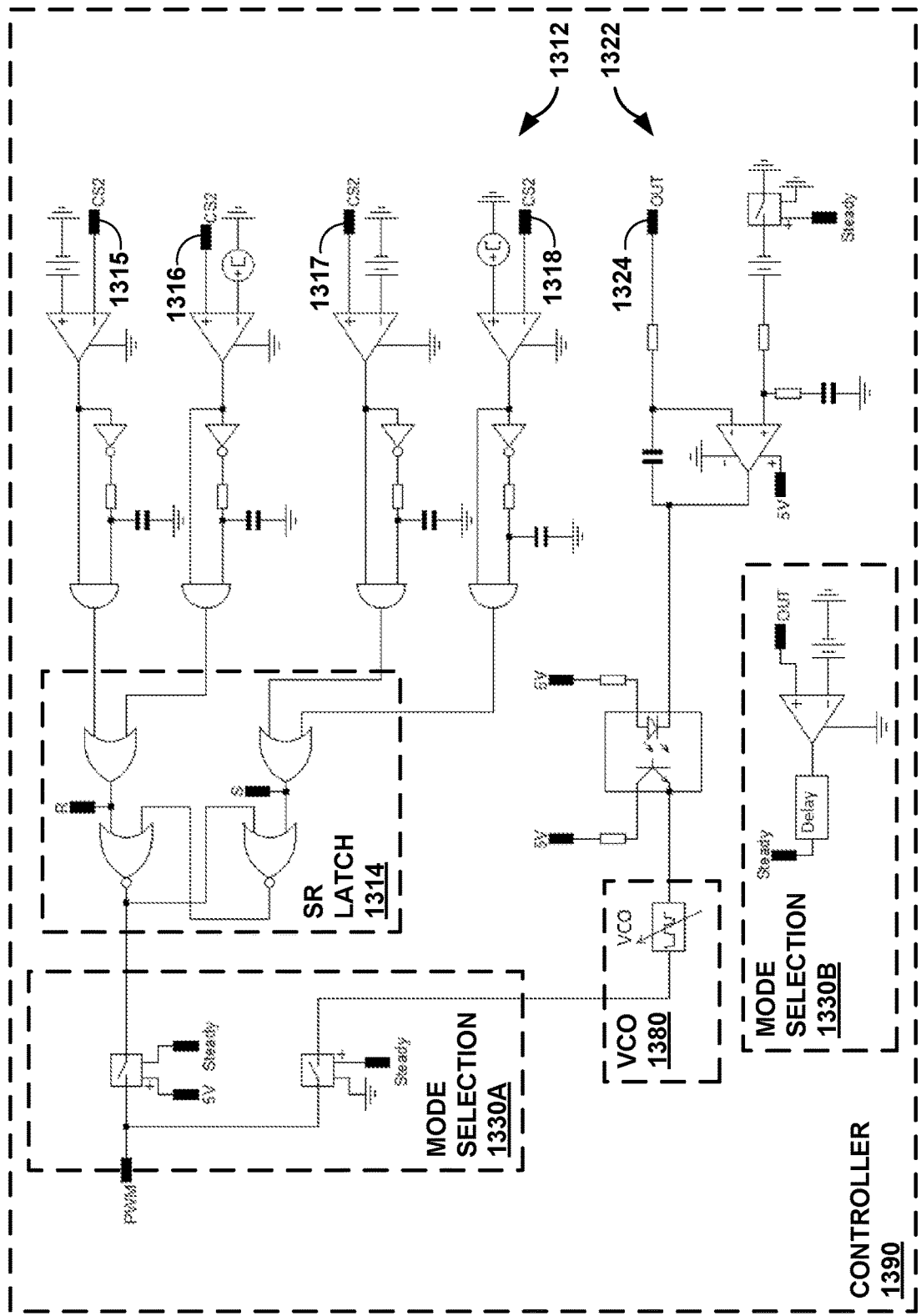
FIG. 13 is a schematic circuit diagram of a controller, in accordance with some examples of this disclosure.

FIG. 13 is a schematic circuit diagram of a controller, in accordance with some examples of this disclosure. FIG. 13 shows a detailed analog implementation for controller 1390 with startup generation circuit 1312 and steady state generator circuit 1322. Although FIG. 13 depicts a hardware implementation for circuits 1312 and 1322, other hardware configurations, as well as software and firmware implementations for circuits 1312 and 1322, are possible. For example, controller 1390 may include memory that can store instructions to cause controller 1390 to control a bridge circuit in startup mode and steady-state mode.

Startup generation circuit 1310 can receive a signal indicating an electrical current through a tank circuit at nodes 1315-1318. Startup generation circuit 1310 may include comparators for detecting whether the electrical current exceeds a threshold level. Startup generation circuit 1310 may include comparators for detecting whether the electrical current has crossed a zero level. Depending on the threshold level (e.g., positive or negative) and the direction of the zero crossing (e.g., rising or falling), startup generation circuit 1312 may deliver a set pulse or a reset pulse to SR latch 1314.

While operating in the first phase and the second phase of the startup mode, mode selection 1330 and 1330B can select the output of startup generation circuit 1310. Thus, controller 1390 can use the output signal from SR latch 1314 to generate the PWM signal in the first phase and the second phase of the startup mode.

Steady-state generation circuit 1322 may receive a voltage feedback signal at nodes 1315-1318. The voltage controller of steady-state generation circuit 1322 may receive the voltage feedback signal. The output of the voltage controller can control VCO 1380 to modulate the frequency of the output signal generated by VCO 1380 to regulate the output voltage of the power converter. While operating in the third phase of the startup mode and in the steady-state mode, mode selection 1330A and 1330B can select the output of steady-state generation circuit 1322. Thus, controller 1390 can use the output signal from VCO 1380 to generate the PWM signal in the third phase of the startup mode and in the steady-state mode.

Figure 14:
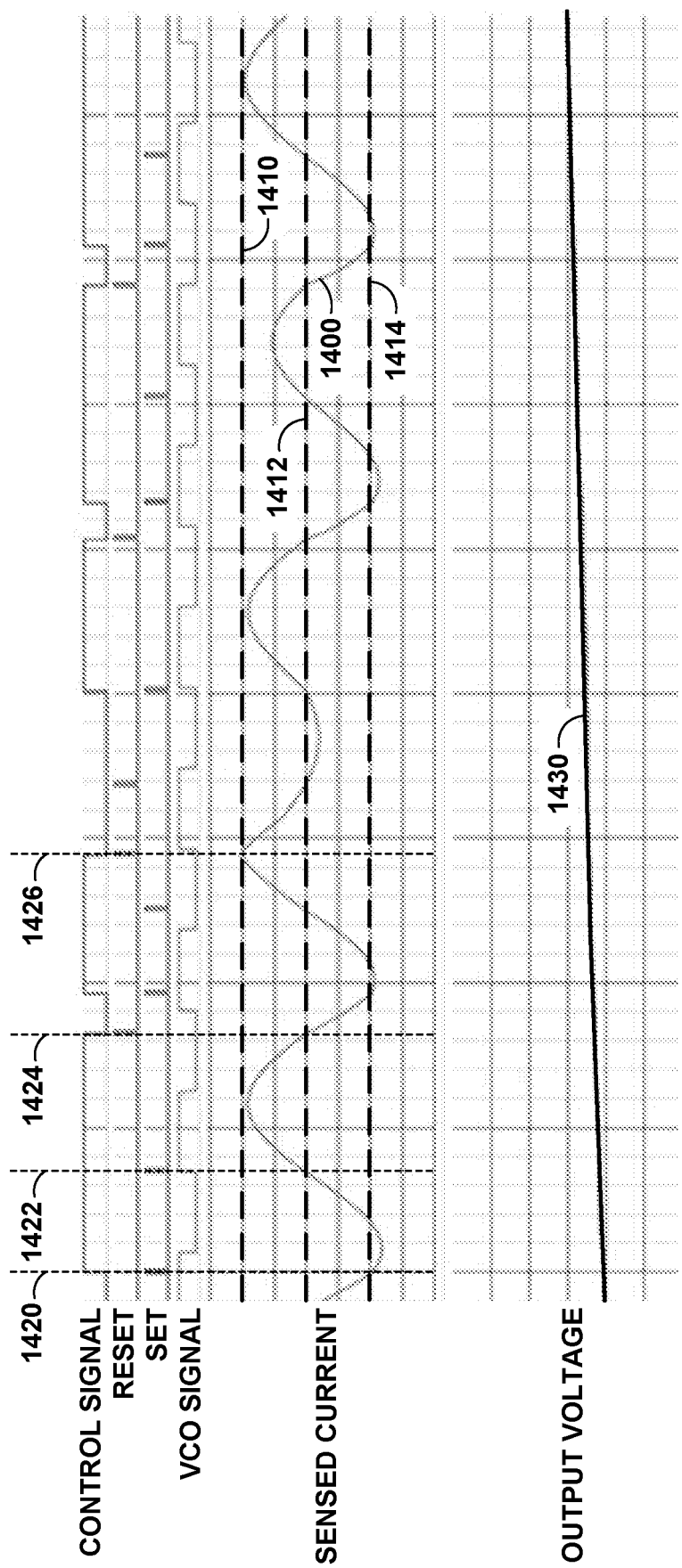
FIGS. 14-16 are timing diagrams of operation in three phases of a startup mode, in accordance with some examples of this disclosure.
Figure 15:
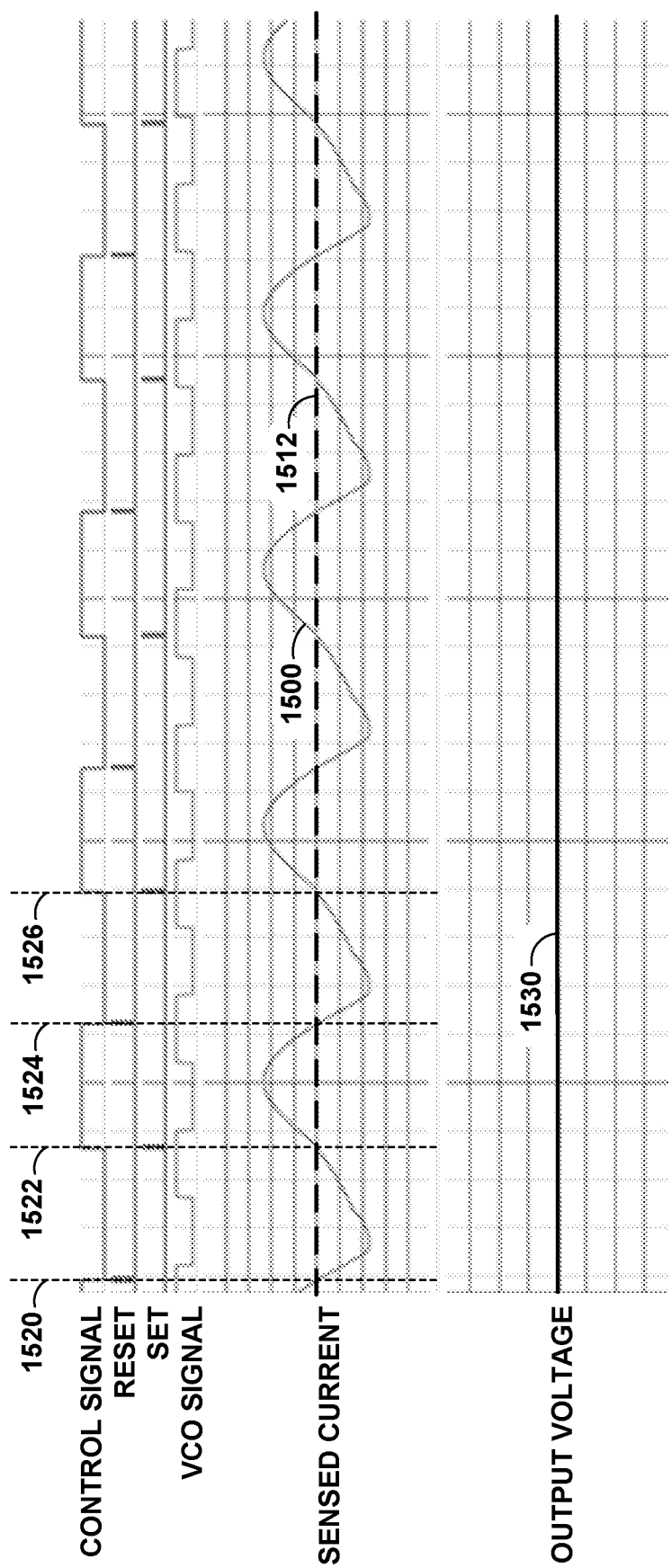
Figure 16:
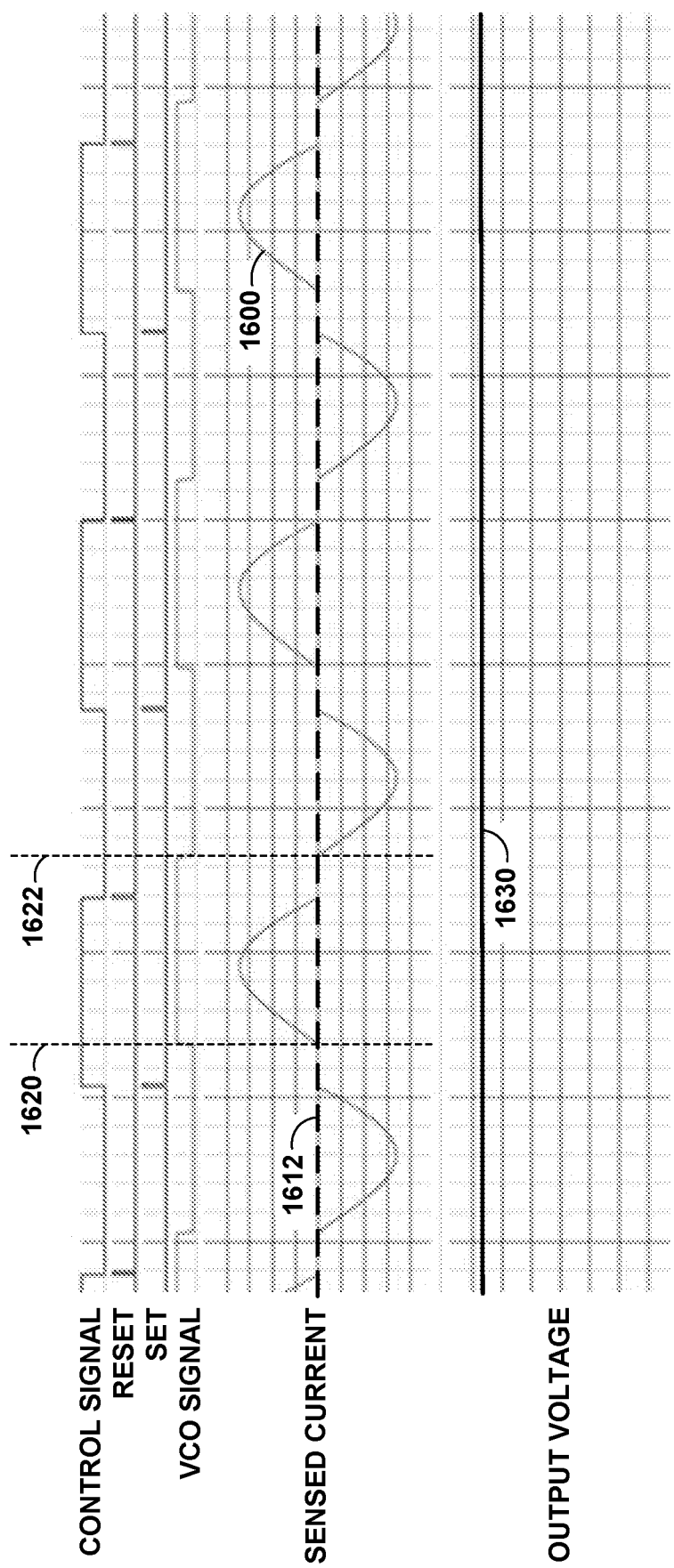

FIGS. 14-16 are timing diagrams of operation in three phases of a startup mode, in accordance with some examples of this disclosure. The techniques of FIGS. 14-16 are described with reference to controller 390 shown in FIG. 3, although other components, such as controllers 490, 590A, 590B, 1190, 1290, and 1390 shown in FIGS. 4, 5A, 5B, and 11-13, may exemplify similar techniques.

Each of FIGS. 14-16 depicts a PWM control signal for a switch in a bridge circuit, along the reset and set signals for an SR latch in a startup generation circuit. Each of FIGS. 14-16 also depicts a VCO output signal for a steady-state generation circuit, the sensed electrical current through a tank circuit, and the bus-side output voltage of the power converter.

FIG. 14 shows a timing diagram of operation in the first phase of the startup mode. In the example of FIG. 14, the startup generation circuit of controller 390 may be configured to control bridge circuit 320 using peak detection and zero-crossing detection of signal 1400, which may indicate an electrical current through bridge circuit 320 or one of tank circuits 350 and 360. At time 1420, controller 390 may detect a peak in signal 1400 by determining that signal 1400 exceeds threshold level 1414.

In the example of FIG. 14, threshold levels 1410 and 1414 are positive and negative threshold levels of current or voltage. Threshold levels 1410 and 1414 may have equal amplitudes (e.g., positive twenty amperes and negative twenty amperes). Controller 390 can use threshold levels 1410 and 1414 for peak detection. A zero crossing occurs when signal 1400 crosses zero level 1412 indicates that the electrical current is not flowing through the tank circuit. Controller 390 can use zero level 1412 for zero-crossing detection.

In response to detecting the peak in signal 1400 at time 1420, controller 390 can toggle one of switches 324-327 by causing the control signal to have an active state. Controller 390 can cause the control signal to have an active state by raising the voltage level of the control signal. When controller 390 delivers a control signal with an active value to a switch in bridge circuit 320, the switch turns on and conducts electrical current. In the example of FIG. 14, the level of signal 1400 generally increases when the switch is turned on.

In response to detecting the zero crossing in signal 1400 at time 1422, controller 390 can activate the set signal, as shown in FIG. 14. At time 1422, the control signal already has a high value, so the pulse in the set signal at time 1422 does not toggle the switch. In response to detecting the zero crossing in signal 1400 at time 1424, controller 390 can activate the reset signal. The pulse in the reset signal at time 1424 may cause the control signal to have an inactive value, which toggles the switch by turning off the switch.

In some examples, controller 390 may use threshold level 1410 for toggling a first switch of bridge circuit 320, and controller 390 may use threshold level 1414 for toggling a second switch of bridge circuit 320. For example, controller 390 can determine that signal 1400 is greater than threshold level 1410 in a first instance at time 1426 and, in response, toggle a first switch of bridge circuit 320. Controller 390 can determine that signal 1400 is less than threshold level 1414 in a second instance at time 1420 and, in response, toggle a second switch of bridge circuit 320.

Controller 390 may be configured to turn on a switch of bridge circuit 320 in response to determining that signal 1400 is less than threshold level 1414 (e.g., at time 1420) or in response to determining that signal 1400 crosses zero level 1422 from negative amplitude to positive amplitude (e.g., at time 1422). Controller 390 may be configured to turn off the switch in response to determining that signal 1400 is greater than threshold level 1410 (e.g., at time 1426) or in response to determining that signal 1400 crosses zero level 1422 from positive amplitude to negative amplitude (e.g., at time 1424). Thus, controller 390 can turn on the switch in response to determining that signal 1400 crosses zero level 1422 in a first direction and can turn off the switch in response to determining that signal 1400 crosses zero level 1422 in a second direction.

During the first phase, hard commutation will occur every time a current limit is reached (e.g., a peak is detected). For switching cycles in which the inductor current is not exceeding the threshold level, the controller will use zero-crossing detection to toggle the switching state, and hard commutation may not occur. Therefore, the first phase has a combination of peak current switching and zero current switching.

During the first phase of the startup mode, output voltage 1430 of the power converter will ramp up. In the example of FIG. 14, output voltage 1430 may ramp up from twenty-five volts to thirty volts. The inductor current waveform may slowly change from an almost linear segment to a sinusoidal shape. The change from a linear to a sinusoidal waveform for signal 1400 occurs once the capacitor voltage reaches a certain value. In addition, as the resonant inductor is more resonating with the capacitor, the inductor current (indicated by signal 1400) at some point will behave in a more sinusoidal manner. The controller may start the second phase of the startup mode when signal 1400 no longer exceeds the threshold level for peak detection every switching cycle. In some examples, the controller may be configured to initiate the second phase in response to determining that signal 1400 has not exceeded threshold 1410 and/or 1414 for a predetermined number of switching cycles while operating in the first phase. The predetermined number of switching cycles may be one, two, three, five, or ten switching cycles.

FIG. 15 shows a timing diagram of operation in the second phase of the startup mode. In the example of FIG. 15, the startup generation circuit of controller 390 may be configured to control bridge circuit 320 using zero-crossing detection of signal 1500, which may indicate an electrical current through bridge circuit 320 or one of tank circuits 350 and 360. A zero crossing occurs when signal 1500 crosses zero level 1512, which indicates that the electrical current is not flowing through the tank circuit.

In response to detecting the zero crossing in signal 1500 from positive amplitude to negative amplitude at times 1520 and 1524, controller 390 can activate the reset signal. The pulse in the reset signal at times 1520 and 1524 may cause the control signal to have an inactive value, which toggles the switch by turning off the switch. In response to detecting the zero crossing in signal 1500 from negative amplitude to positive amplitude at times 1522 and 1526, controller 390 can activate the reset signal. The pulse in the set signal at times 1522 and 1526 may cause the control signal to have an inactive value, which toggles the switch by turning on the switch.

During the second phase of the startup mode, the operation may be different than the first phase. The controller may start the second phase when the inductor and capacitor are resonating and when the inductor current is not hitting the peak current limit anymore. The controller may be configured to toggle the switches at every zero crossing during the second phase. Zero crossing detection may allow automatic tracking of the resonant period, such that hard commutation may not occur in the second phase. The switching frequency in the second phase may be the result of the zero-crossing detection or frequency tracking performed by the controller. The controller can operate in the second phase for a timed period or until output voltage 1530 reaches a threshold level, at which time the controller can start the third phase. In the example of FIG. 15, output voltage 1530 may be approximately two hundred volts.

FIG. 16 shows a timing diagram of operation in the third phase of the startup mode. In the example of FIG. 16, the startup generation circuit of controller 390 may be configured to control bridge circuit 320 using a DCM. While operating in DCM, controller 390 can operate at a switching frequency less than the resonant frequency. Thus, in the example of FIG. 16, signal 1600 returns to zero level 1612 during each switching cycle before controller 390 toggles the switches of bridge circuit 320.

In the third phase, controller 390 may generate a control signal based on the VCO signal. Controller 390 can turn on a high-side switch at time 1620 in response to a rising edge in the VCO signal. By turning on the high-side switch, controller 390 delivers electrical power to tank circuit 360. Controller 390 can turn on a low-side switch at time 1622 in response to a falling edge in the VCO signal.

The controller may determine information indicating the voltage and switching period at the end of the second phase of the startup mode. The controller can use this information to set the initial condition for the proportional-integral-derivative (PID) controller in the third phase of the startup mode. In the third phase, the controller may run in closed-loop frequency regulation while the voltage reference is being ramped up slowly to the desired reference voltage. In the example of FIG. 16, output voltage 1630 may be approximately two hundred volts.

Figure 17:
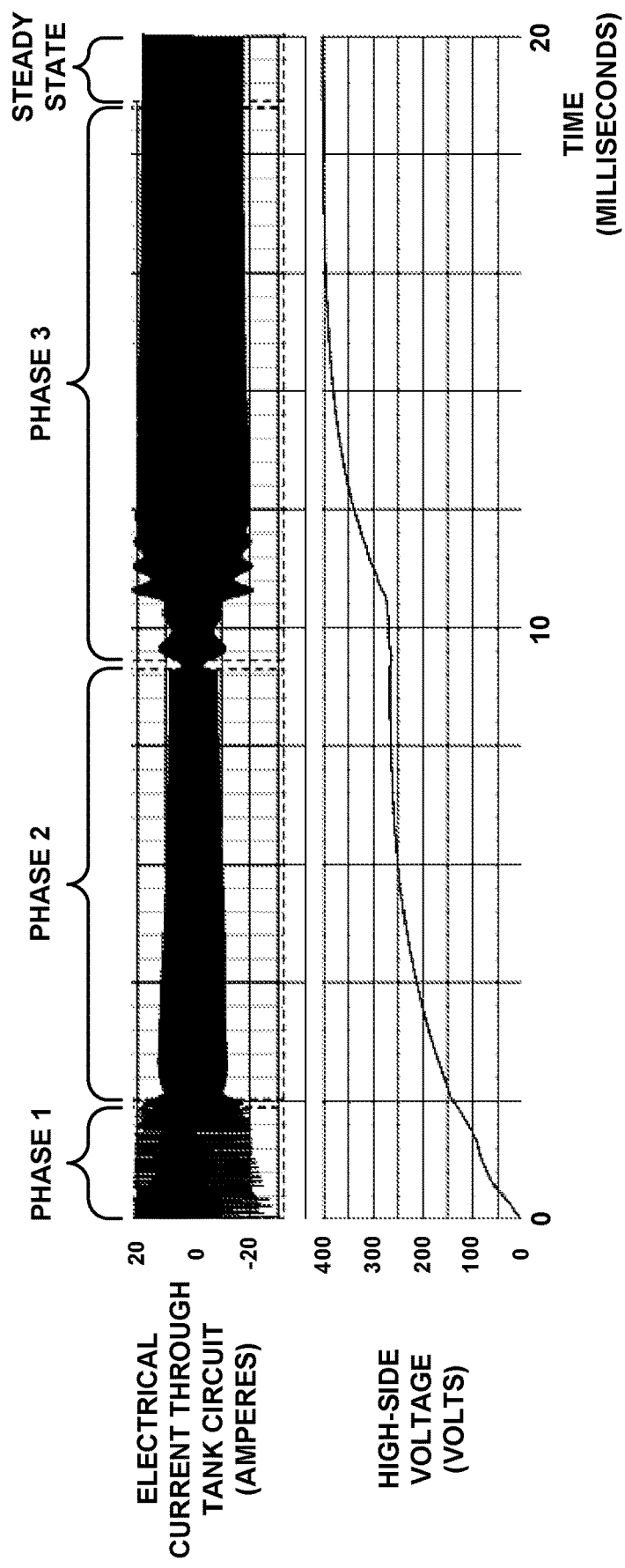
FIG. 17 is a timing diagram showing the electrical current through a tank circuit and the high-side voltage, in accordance with some examples of this disclosure.

FIG. 17 is a timing diagram showing the electrical current through a tank circuit and the high-side voltage, in accordance with some examples of this disclosure. FIG. 17 shows the current and voltage through three phases of a startup mode and during a steady-state operating mode.

Figure 18:
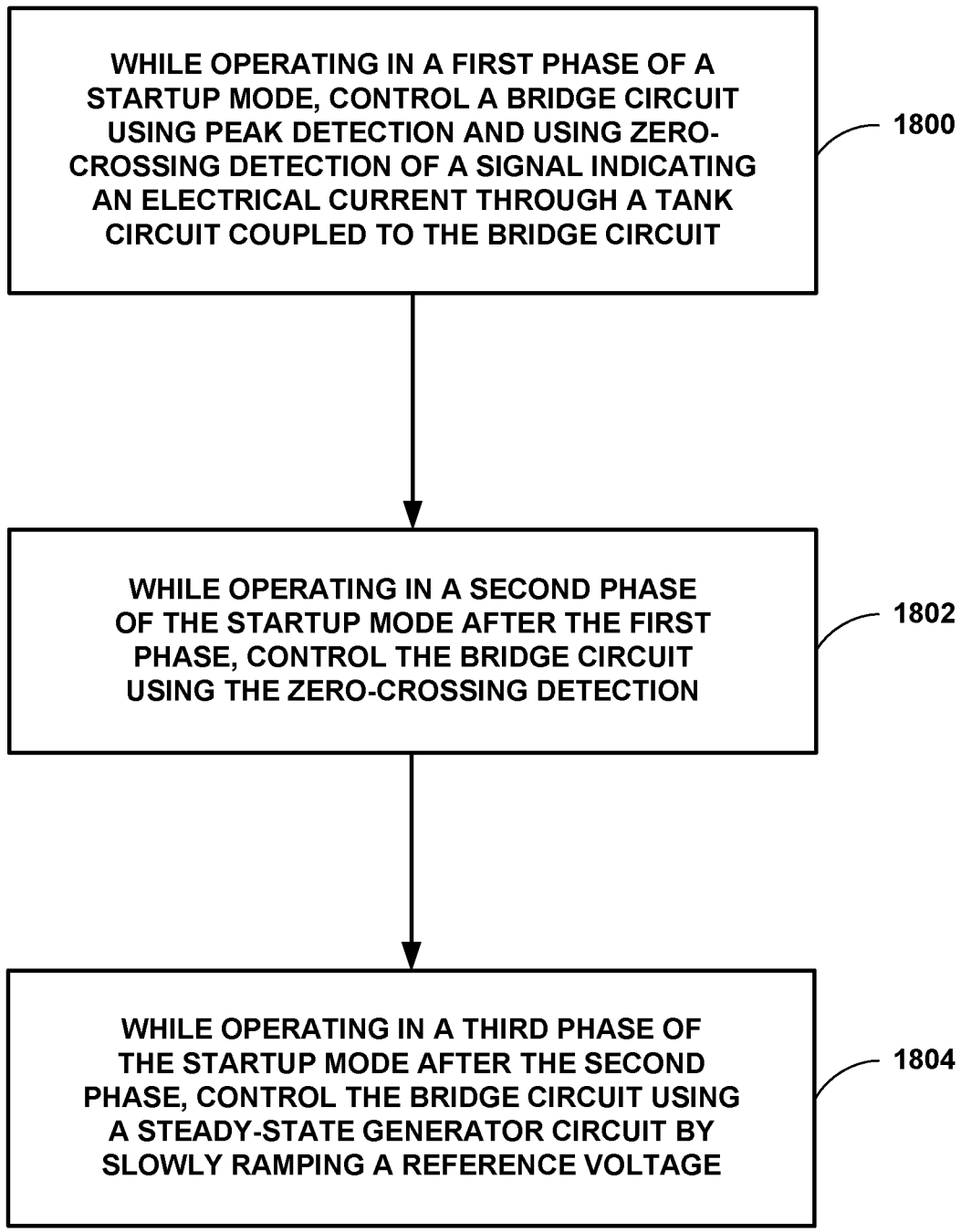
FIG. 18 is a flow diagram illustrating example techniques for controlling a bridge circuit in a startup mode, in accordance with some examples of this disclosure.

FIG. 18 is a flowchart illustrating example techniques for controlling a bridge circuit in a startup mode, in accordance with some examples of this disclosure. The techniques of FIG. 18 are described with reference to controller 390 shown in FIG. 3, although other components, such as controllers 490, 590A, 590B, 1190, 1290, and 1390 shown in FIGS. 4, 5A, 5B, and 11-13, may exemplify similar techniques.

In the example of FIG. 18, while operating in a first phase of a startup mode, controller 390 controls bridge circuit 320 using peak detection and using zero-crossing detection of an electrical current through tank circuit 350 or 360 (1800). Controller 390 may be configured to receive a sensed signal indicating the electrical current through tank circuit 350 or 360 from sensor 332 or 334.

Controller 390 may cause the first phase of the startup mode to begin when power converter 300 and/or controller 390 is powered up. Another possible triggering event for the beginning of the first phase is the coupling of an energy source or load to node 312 or node 322. Controller 390 can cause the first phase to end and the second phase to begin when the electrical current through tank circuit 350 or 360 no longer exceeds the threshold level. In some examples, controller 390 will start the second phase when the electrical current does not exceed the threshold level for a certain number of consecutive switching cycles.

In the example of FIG. 18, while operating in a second phase of the startup mode after the first phase, controller 390 controls bridge circuit 320 using the zero-crossing detection (1802). Controller 390 may end the second phase when the voltage level at node 322 exceeds a threshold level, where the threshold level is greater than one, two, three, or four hundred volts. Additionally or alternatively, controller 390 may end the second phase in response to determining that a predetermined time duration has elapsed since initiating the second phase. The predetermined time duration may be one, two, or five milliseconds.

In the example of FIG. 18, while operating in a third phase of the startup mode after the second phase, controller 390 controls bridge circuit 320 using DCM for the electrical current (1804). Controller 390 may be configured to control bridge circuit 320 at a switching frequency less than the resonant frequency of tank circuit 350 and/or tank circuit 360. Controller 390 can use a VCO signal to toggle the switches in bridge circuit 320. The frequency of the VCO may be less than the resonant frequency of tank circuit 350 and/or tank circuit 360.

Controller 390 may determine the initial conditions of the third phase based on the parameters of power converter 300 at the end of the second phase. The initial conditions for the third phase may include the switching frequency of the control signals delivered by controller 390 to switches 324-327. The parameters of power converter 300 at the end of the second phase may include the voltage level and/or electrical current at node 322 and/or at any other node in power converter 300, including the signals sensed by sensors 332 and 334. The parameters can also include the switching frequency and duty cycle of the control signals delivered by controller 390 to switches 324-327.

Controller 390 may be configured to determine the parameters at the end of the second phase (e.g., during the final one hundred switching cycles of the second phase). Additionally or alternatively, controller 390 may be configured to determine the parameters at the beginning of the third phase (e.g., during the first one hundred switching cycles of the third phase). Controller 390 can use the determined parameters to determine the initial conditions for the third phase.

Although the example process of FIG. 18 is described herein in the context of power converter 300 and controller 390, the example process of FIG. 18 can be used for any resonant power converter circuit, including power converters 200, 300, 400, 500A, 500B, 900, 1100, and 1200 shown in FIGS. 2-5B, 9, 12, and 13. A controller can use the example process of FIG. 18 to control a uni-directional power converter or a bi-directional power converter. A controller can use the example process of FIG. 18 to control the switches a power converter, where the switches may include MOSFETs, any other type of FETs, IGBTs, and/or any other type of switches. The example process may be used to control the operation of switches that include silicon, GaN, SiC, and/or any other material.

Figure 19:
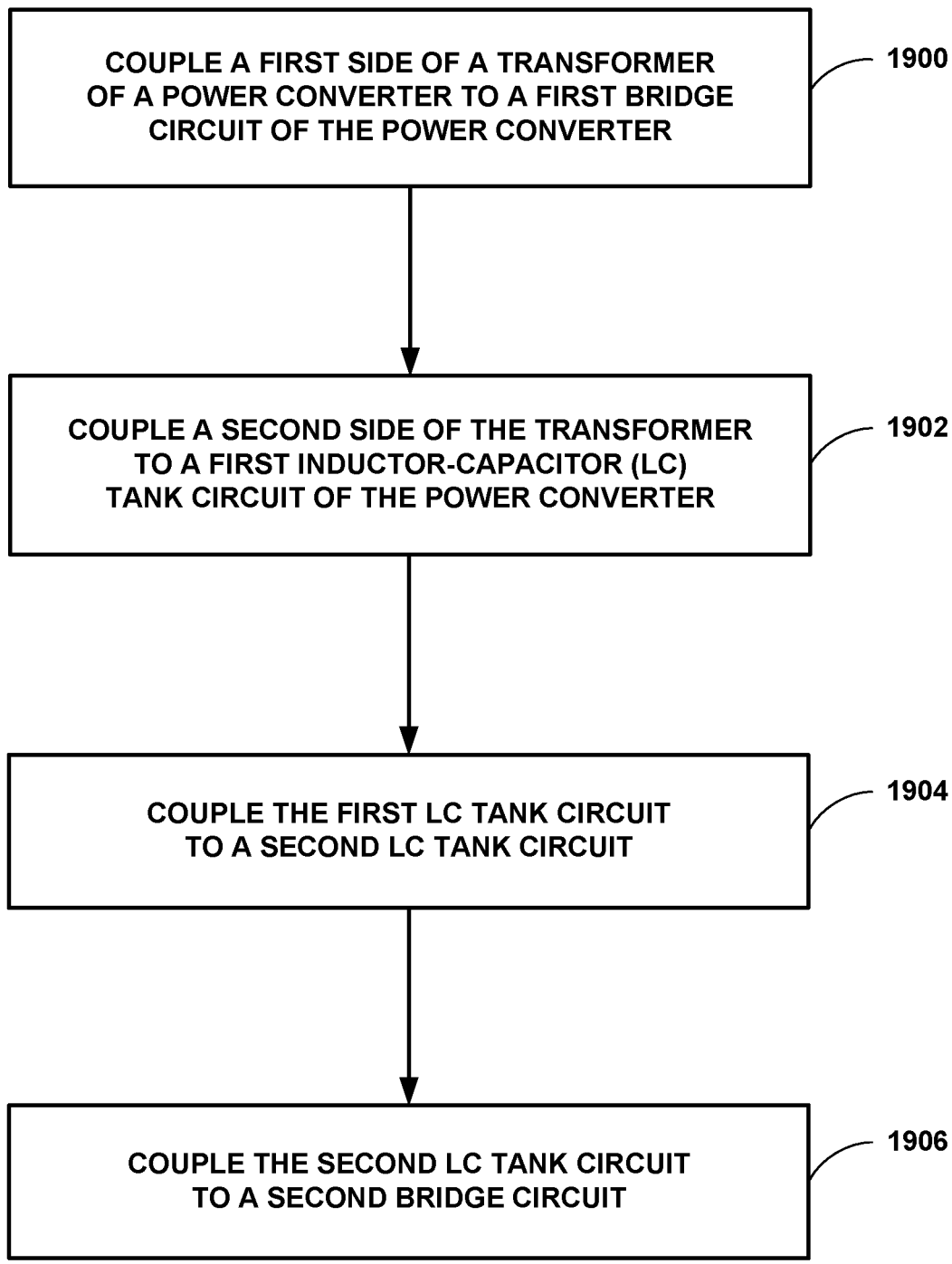
FIG. 19 is a flow diagram illustrating example techniques for assembling a power converter, in accordance with some examples of this disclosure.

FIG. 19 is a flow diagram illustrating example techniques for assembling a power converter, in accordance with some examples of this disclosure. The techniques of FIG. 19 are described with reference to power converter 300 shown in FIG. 3, although other components, such as power converters 400, 500A, 500B, 900, and 1100 shown in FIGS. 4, 5A, 5B, 9, and 11, may exemplify similar techniques.

In the example of FIG. 19, the first side (e.g., "the battery side") of transformer 340 is coupled to bridge circuit 310 (1900). A first node on the first side of transformer 340 may be coupled to a middle node of a first half-bridge circuit of bridge circuit 310. The first half-bridge circuit of bridge circuit 310 includes switches 314 and 315. A second node on the first side of transformer 340 may be coupled to a middle node of a second half-bridge circuit of bridge circuit 310. The first half-bridge circuit of bridge circuit 310 includes switches 316 and 317.

In the example of FIG. 19, the second side (e.g., "the bus side") of transformer 340 is coupled to tank circuit 350 (1902). A first node on the second side of transformer 340 may be coupled to inductor 354 of tank circuit 350. A second node on the second side of transformer 340 may be coupled to sensor 332 and/or capacitor 356 of tank circuit 350. In some examples, capacitor 356 may be coupled in series with inductor 354 between transformer 340 and inductor 352).

In the example of FIG. 19, tank circuit 350 is coupled to tank circuit 360 (1904). Tank circuits 350 and 360 may share inductor 352, such that inductor 352 operates as an inductance for both of tank circuits 350 and 360. In some examples, inductor 352 may be replaced by a second transformer (see, e.g., transformers 442, 542A, and 542B shown in FIGS. 4, 5A, and 5B). At a first node between tank circuits 350 and 360, inductor 354 of tank circuit 350 may be coupled to inductor 364 of tank circuit 360 and to inductor 352. At a second node between tank circuits 350 and 360, capacitor 356 of tank circuit 350 may be coupled, through sensor 334, to capacitor 366 of tank circuit 360 and to inductor 352.

In the example of FIG. 19, tank circuit 360 is coupled to bridge circuit 320 (1906). At a first node between tank circuit 360 and bridge circuit 320, inductor 364 may be coupled to a middle node of a first half-bridge circuit of bridge circuit 320. The first half-bridge circuit of bridge circuit 320 includes switches 324 and 325. At a second node between tank circuit 360 and bridge circuit 320, capacitor 366 may be coupled to a middle node of a second half-bridge circuit of bridge circuit 320. The first half-bridge circuit of bridge circuit 320 includes switches 326 and 327.

Bridge circuit 320 can be assembled in the following manner. High-side switch 324 may be coupled between a high-side power supply (e.g., node 322) and a first middle node of bridge circuit 320. Low-side switch 325 may be coupled between a low-side power supply (e.g., ground) and the first middle node of bridge circuit 320. The first middle node of bridge circuit 320 may be coupled to inductor 364. High-side switch 326 may be coupled between the high-side power supply and a second middle node of bridge circuit 320. Low-side switch 327 may be coupled between the low-side power supply and the second middle node of bridge circuit 320. The second middle node of bridge circuit 320 may be coupled to capacitor 366.

By arranging tank circuits 350 and 360 on the bus side of power converter 300, the RMS electrical current through capacitors 356 and 366 is lower, as compared to the RMS electrical current on the battery side of power converter 300. Arranging tank circuit 350 or 360 on the battery side of transformer 340 may be exposed to higher temperatures and may have higher power loss. Designing a capacitor for higher RMS current may create issues with limited selection, higher cost, and lower efficiency due to higher power losses.

Power converter 300 can be assembled using any type of switches for bridge circuits 310 and 320, including MOSFETs, any other types of FETs, and IGBTs. Power converter 300 can be assembled using switches having any material, including silicon, GaN, SiC, or any other material.

The following numbered examples demonstrate one or more aspects of the disclosure.

Example 1

A method includes controlling a bridge circuit, while operating in a first phase of a startup mode, using peak detection and using zero-crossing detection of an electrical current through a tank circuit coupled to the bridge circuit. The method also includes controlling the bridge circuit using the zero-crossing detection while operating in a second phase of the startup mode after the first phase. The method further includes controlling the bridge circuit using a discontinuous-current mode for the electrical current while operating in a third phase of the startup mode after the second phase.

Example 2

The method of example 1, further including controlling the bridge circuit using soft switching while operating in a steady-state mode after the third phase of the startup mode.

Example 3

The method of any combination of examples 1-2, controlling the bridge circuit using the peak detection while operating in the first phase includes determining that the signal exceeds a threshold level and toggling a switch of the bridge circuit in response to determining that the signal exceeds the threshold level.

Example 4

The method of any combination of examples 1-3, determining that the signal exceeds the threshold level includes determining that the signal is greater than a positive threshold level in a first instance, and toggling the switch of the bridge circuit includes toggling a first switch of the bridge circuit in response to determining that the signal is greater than the positive threshold level.

Example 5

The method of any combination of examples 1-4, determining that the signal exceeds the threshold level includes determining that the signal is less than a negative threshold level, and toggling the switch of the bridge circuit includes toggling a second switch of the bridge circuit in response to determining that the signal is less than the negative threshold level.

Example 6

The method of any combination of examples 1-5, controlling the bridge circuit using the zero-crossing detection while operating in the first phase and while operating in the second phase includes determining that the signal has crossed a zero level and toggling a switch of the bridge circuit in response to determining that the signal has crossed the zero level.

Example 7

The method of any combination of examples 1-6, further including, while operating in the first phase, turning on a low-side switch of the bridge circuit for more than one switching cycle and, while operating in the first phase, turning off a high-side switch of the bridge circuit for more than one switching cycle, where a load terminal of the high-side switch is coupled to a load terminal of the low-side switch.

Example 8

The method of any combination of examples 1-7, where the bridge circuit is coupled to a tank circuit, the method further including, while operating in the third phase, controlling switches of the bridge circuit at a switching frequency less than a resonant frequency of the tank circuit.

Example 9

The method of any combination of examples 1-8, further including, while operating in the first phase, determining that the signal has not exceeded a threshold level for a predetermined number of switching cycles and initiating the second phase in response to determining that the signal has not exceeded the threshold level for the predetermined number of switching cycles while operating in the first phase.

Example 10

The method of any combination of examples 1-9, further including, while operating in the second phase, determining that a predetermined time duration has elapsed since initiating the second phase and initiating the third phase in response to determining that the predetermined time duration has elapsed since initiating the second phase.

Example 11

The method of any combination of examples 1-10, further including, while operating in the second phase, determining that an output voltage of the bridge circuit is greater than a threshold level and initiating the third phase in response to determining that the output voltage is greater than the threshold level while operating in the second phase.

Example 12

The method of any combination of examples 1-11, controlling the bridge circuit while operating in the second phase includes toggling the bridge circuit at a resonant frequency of a tank circuit coupled to the bridge circuit.

Example 13

The method of any combination of examples 1-12, further including determining an output voltage at an end of the second phase or at a beginning of the third phase, determining a switching frequency at the end of the second phase or at the beginning of the third phase, and determining initial conditions of the third phase based on the output voltage and the switching frequency.

Example 14

The method of any combination of examples 1-13, further including, while operating in the third phase, determining that an output voltage of the bridge circuit has reached a target voltage and initiating the steady-state mode in response to determining that the output voltage has reached the target voltage during the third phase.

Example 15

A controller is configured to control a bridge circuit and includes a startup generation circuit configured to control, while operating in a first phase of a startup mode, the bridge circuit using peak detection and using zero-crossing detection of an electrical current through a tank circuit coupled to the bridge circuit. The startup generation circuit is also configured to control the bridge circuit using the zero-crossing detection while operating in a second phase of the startup mode after the first phase. The startup generation circuit is further configured to control the bridge circuit using a discontinuous-current mode for the electrical current while operating in a third phase of the startup mode after the second phase. The controller also includes a steady-state generation circuit configured to control the bridge circuit using soft switching while operating in a steady-state mode after the third phase of the startup mode.

Example 16

The controller of example 15, the startup generation circuit is configured to control the bridge circuit using the peak detection while operating in the first phase at least in part by determining that the signal exceeds a threshold level and toggling a switch of the bridge circuit in response to determining that the signal exceeds the threshold level.

Example 17

The controller of any combination of examples 15-16, the startup generation circuit is configured to determine that the signal exceeds the threshold level at least in part by determining that the signal is greater than a positive threshold level in a first instance, wherein the controller is configured to toggle the switch of the bridge circuit at least in part by toggling a first switch of the bridge circuit in response to determining that the signal is greater than the positive threshold level.

Example 18

The controller of any combination of examples 15-17, the startup generation circuit is configured to determine that the signal exceeds the threshold level at least in part by determining that the signal is less than a negative threshold level, wherein the controller is configured to toggle the switch of the bridge circuit at least in part by toggling a second switch of the bridge circuit in response to determining that the signal is less than the negative threshold level.

Example 19

The controller of any combination of examples 15-18, the startup generation circuit is configured to control the bridge circuit using the zero-crossing detection while operating in the first phase and while operating in the second phase at least in part by determining that the signal has crossed a zero level and toggling a switch of the bridge circuit in response to determining that the signal has crossed the zero level.

Example 20

The controller of any combination of examples 15-19, the startup generation circuit is further configured to, while operating in the first phase, turn on a low-side switch of the bridge circuit for more than one switching cycle and, while operating in the first phase, turn off a high-side switch of the bridge circuit for more than one switching cycle. A load terminal of the high-side switch is coupled to a load terminal of the low-side switch.

Example 21

The controller of any combination of examples 15-20, the bridge circuit is coupled to a tank circuit, and the startup generation circuit is further configured to, while operating in the third phase, control switches of the bridge circuit at a switching frequency less than a resonant frequency of the tank circuit.

Example 22

The controller of any combination of examples 15-21, the startup generation circuit is further configured to, while operating in the first phase, determine that the signal has not exceeded a threshold level for a predetermined number of switching cycles and initiate the second phase in response to determining that the signal has not exceeded the threshold level for the predetermined number of switching cycles while operating in the first phase.

Example 23

The controller of any combination of examples 15-22, the startup generation circuit is further configured to, while operating in the second phase, determine that a predetermined time duration has elapsed since initiating the second phase and initiate the third phase in response to determining that the predetermined time duration has elapsed since initiating the second phase.

Example 24

The controller of any combination of examples 15-23, the startup generation circuit is further configured to, while operating in the second phase, determine that an output voltage of the bridge circuit is greater than a threshold level and initiate the third phase in response to determining that the output voltage is greater than the threshold level while operating in the second phase.

Example 25

The controller of any combination of examples 15-24, the startup generation circuit is configured to control the bridge circuit while operating in the second phase at least in part by toggling the bridge circuit at a resonant frequency of a tank circuit coupled to the bridge circuit.

Example 26

The controller of any combination of examples 15-25, wherein the startup generation circuit is further configured to determine an output voltage at an end of the second phase or at a beginning of the third phase, determine a switching frequency at the end of the second phase or at the beginning of the third phase, and determine initial conditions of the third phase based on the output voltage and the switching frequency.

Example 27

The controller of any combination of examples 15-26, wherein the startup generation circuit is further configured to, while operating in the third phase, determine that an output voltage of the bridge circuit has reached a target voltage and initiate the steady-state mode in response to determining that the output voltage has reached the target voltage during the third phase.

Example 28

A device includes a computer-readable medium having executable instructions stored thereon, configured to be executable by processing circuitry for causing the processing circuitry to, while operating in a first phase of a startup mode, control the bridge circuit using peak detection and using zero-crossing detection of the voltage or the current through the tank circuit. The instructions further cause the processing circuitry to, while operating in a second phase of the startup mode after the first phase, control the bridge circuit using the zero-crossing detection. The instructions also cause the processing circuitry to, while operating in a third phase of the startup mode after the second phase, control the bridge circuit using a discontinuous-current mode.

Example 29

The device of any combination of example 28, wherein the instructions further cause the processing circuitry to perform the method of examples 1-14 or any combination thereof.

Example 30

A power converter including a first bridge circuit, a second bridge circuit, and a transformer, where a first side of the transformer is coupled to the first bridge circuit. The power converter further includes a first LC tank circuit coupled to a second side of the transformer and a second LC tank circuit coupled to the first LC tank circuit and coupled to the second bridge circuit.

Example 31

The power converter of example 30, the transformer is a first transformer, the resonant-mode converter circuit further including a second transformer, where a first side of the second transformer includes an inductance of the first LC tank circuit, and where a second side of the second transformer includes an inductance of the second LC tank circuit.

Example 32

The power converter of any combination of examples 30-31, where the first LC tank circuit includes a first capacitor coupled between the second side of the first transformer and the first side of the second transformer and a first inductor coupled between the second side of the first transformer and the first side of the second transformer.

Example 33

The power converter of any combination of examples 30-32, where the second LC tank circuit includes a second capacitor coupled between the second side of the second transformer and the second bridge circuit and a second inductor coupled between the second side of the second transformer and the second bridge circuit.

Example 34

The power converter of any combination of examples 30-33, where a turns ratio of the second transformer is one.

Example 35

The power converter of any combination of examples 30-34, where the second bridge circuit includes a first high-side switch coupled between a high-side power supply and a first node of the first side of the transformer, a first low-side switch coupled between the first node of the first side of the transformer and a low-side power supply, a second high-side switch coupled between the high-side power supply and a second node of the first side of the transformer, and a second low-side switch coupled between the second node of the first side of the transformer and the low-side power supply.

Example 36

The power converter of any combination of examples 30-35, where the second bridge circuit includes switches including at least one of gallium nitride or silicon carbide.

Example 37

The power converter of any combination of examples 30-36, where the second bridge circuit includes at least one of a metal-oxide-semiconductor field-effect transistor or an insulated-gate bipolar transistor.

Example 38

The power converter of any combination of examples 30-37, wherein the transformer is a first transformer, where the power converter further includes a third bridge circuit and a second transformer. A first side of the second transformer is coupled to the third bridge circuit, and a second side of the first transformer is coupled to a second side of the second transformer.

Example 39

The power converter of any combination of examples 30-38, where the second side of the first transformer is coupled in parallel with the second side of the second transformer.

Example 40

The power converter of any combination of examples 30-39, where a first node on the second side of the first transformer is coupled to a first node on the second side of the second transformer.

Example 41

The power converter of any combination of examples 30-40, where a second node on the second side of the first transformer is coupled to a second node on the second side of the second transformer.

Example 42

The power converter of any combination of examples 30-41, where the second side of the first transformer is coupled in series with the second side of the second transformer.

Example 43

The power converter of any combination of examples 30-42, where a first node on the second side of the first transformer is coupled to a first node of the first LC tank circuit, where a second node on the second side of the first transformer is coupled to a first node on the second side of the second transformer, and where a second node on the second side of the second transformer is coupled to a second node of the first LC tank circuit.

Example 44

The power converter of any combination of examples 30-43, further including a controller configured to perform the method of examples 1-14 or any combination thereof.

Example 45

A method for assembling a power converter, the method including coupling a first side of a transformer of the power converter to a first bridge circuit of the power converter. The method also includes coupling a second side of the transformer to first inductor-capacitor (LC) tank circuit of the power converter. The method further includes coupling the first LC tank circuit to a second LC tank circuit; and coupling the second LC tank circuit to a second bridge circuit.

Example 46

The method of example of 46, further including coupling the first LC tank circuit to a first side of a second transformer.

Example 47

The method of any combination of examples 45-46, further including coupling the second LC tank circuit to a second side of the second transformer.

Example 48

The method of any combination of examples 45-47, further including coupling a first side of a second transformer to a third bridge circuit.

Example 49

The method of any combination of examples 45-48, further including coupling a second side of the second transformer to the first LC tank circuit.

This disclosure has attributed functionality to controllers 290, 390, 490, 590A, 590B, 1190, 1290, and 1390. Controllers 290, 390, 490, 590A, 590B, 1190, 1290, and 1390 may include one or more processors. Controllers 290, 390, 490, 590A, 590B, 1190, 1290, and 1390 may include any combination of integrated circuitry, discrete logic circuitry, analog circuitry, such as one or more microprocessors, DSPs, ASICs, or FPGAs. In some examples, controllers 290, 390, 490, 590A, 590B, 1190, 1290, and 1390 may include multiple components, such as any combination of one or more microprocessors, one or more DSPs, one or more ASICs, or one or more FPGAs, as well as other discrete or integrated logic circuitry, and/or analog circuitry.

The techniques described in this disclosure may also be embodied or encoded in an article of manufacture including a non-transitory computer-readable storage medium. Example non-transitory computer-readable storage media may include RAM, ROM, programmable ROM (PROM), erasable programmable ROM (EPROM), electronically erasable programmable ROM (EEPROM), flash memory, a hard disk, a compact disc ROM (CD-ROM), a floppy disk, a cassette, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A controller configured to control a bridge circuit, the controller comprising:
   a startup generation circuit configured to:
   receive a signal, wherein a magnitude of the signal indicates an electrical current through a tank circuit coupled to the bridge circuit;
   while operating in a first phase of a startup mode, control the bridge circuit using peak detection of the signal and using zero-crossing detection of the signal, wherein the startup generation circuit is configured to control the bridge circuit using the peak detection while operating in the first phase at least in part by:
      determining that the magnitude of the signal exceeds a threshold level; and
      toggling a switch of the bridge circuit in response to determining that the signal exceeds the threshold level;
   while operating in a second phase of the startup mode after the first phase, control the bridge circuit using the zero-crossing detection of the signal and by deactivating the peak detection of the signal; and
   while operating in a third phase of the startup mode after the second phase, control the bridge circuit using a discontinuous-current mode for the electrical current; and
   a steady-state generation circuit configured to, while operating in a steady-state mode after the third phase of the startup mode, control the bridge circuit using soft switching.

2. The controller of claim 1,
   wherein the startup generation circuit is configured to determine that the magnitude of the signal exceeds the threshold level at least in part by determining that the magnitude of the signal is greater than a positive threshold level in a first instance,
   wherein the controller is configured to toggle the switch of the bridge circuit at least in part by toggling a first switch of the bridge circuit in response to determining that the magnitude of the signal is greater than the positive threshold level; and
   wherein the startup generation circuit is configured to determine that the magnitude of the signal exceeds the threshold level at least in part by determining that the magnitude of the signal is less than a negative threshold level, and
   wherein the controller is configured to toggle the switch of the bridge circuit at least in part by toggling the switch of the bridge circuit in response to determining that the magnitude of the signal is less than the negative threshold level.

3. The controller of claim 1, wherein the startup generation circuit is configured to control the bridge circuit using the zero-crossing detection while operating in the first phase and while operating in the second phase at least in part by:
   determining that the magnitude of the signal has crossed the zero level; and
   toggling the switch of the bridge circuit in response to determining that the magnitude of the signal has crossed the zero level.

4. The controller of claim 1, wherein the startup generation circuit is further configured to:
   while operating in the first phase, turn on a low-side switch of the bridge circuit and maintain the activated state of the low-side switch for a time period extending for more than one switching cycle; and
   while operating in the first phase, turn off a high-side switch of the bridge circuit and maintain the deactivated state of the high-side switch for the time period,
   wherein a load terminal of the high-side switch is coupled to a load terminal of the low-side switch.

5. The controller of claim 1,
   wherein the bridge circuit is coupled to the tank circuit, and
   wherein the startup generation circuit is further configured to, while operating in the third phase, control switches of the bridge circuit at a switching frequency less than a resonant frequency of the tank circuit.

6. The controller of claim 1, wherein the startup generation circuit is further configured to:
while operating in the first phase, determine that the magnitude of the signal has not exceeded a threshold level for a predetermined number of switching cycles; and
initiate the second phase in response to determining that the magnitude of the signal has not exceeded the threshold level for the predetermined number of switching cycles while operating in the first phase.

7. The controller of claim 1, wherein the startup generation circuit is further configured to:
while operating in the second phase, determine that a predetermined time duration has elapsed since initiating the second phase; and
initiate the third phase in response to determining that the predetermined time duration has elapsed since initiating the second phase.

8. The controller of claim 1, wherein the startup generation circuit is further configured to:
while operating in the second phase, determine that a magnitude of an output voltage of the bridge circuit is greater than a threshold level; and
initiate the third phase in response to determining that the magnitude of the output voltage is greater than the threshold level while operating in the second phase.

9. The controller of claim 1, wherein the startup generation circuit is configured to control the bridge circuit while operating in the second phase at least in part by toggling the bridge circuit at a resonant frequency of the tank circuit coupled to the bridge circuit.

10. The controller of claim 1, wherein the startup generation circuit is further configured to:
determine an output voltage at an end of the second phase or at a beginning of the third phase;
determine a switching frequency at the end of the second phase or at the beginning of the third phase; and
determine initial conditions of the third phase based on the output voltage and the switching frequency.

11. The controller of claim 1, wherein the startup generation circuit is further configured to:
while operating in the third phase, determine that a magnitude of an output voltage of the bridge circuit has reached a target voltage; and
initiate the steady-state mode in response to determining that the magnitude of the output voltage has reached the target voltage during the third phase.

12. A method comprising:
receiving a signal indicating an electrical current through a tank circuit, wherein the tank circuit is coupled to a bridge circuit;
while operating in a first phase of a startup mode, controlling the bridge circuit using peak detection of the signal and using zero-crossing detection of the signal, wherein controlling the bridge circuit using the peak detection while operating in the first phase comprises:
determining that the magnitude of the signal exceeds a threshold level; and
toggling a switch of the bridge circuit in response to determining that the signal exceeds the threshold level;
while operating in a second phase of the startup mode after the first phase, controlling the bridge circuit using the zero-crossing detection of the signal and by deactivating the peak detection of the signal; and
while operating in a third phase of the startup mode after the second phase, controlling the bridge circuit using a discontinuous-current mode for the electrical current.

13. The method of claim 12, further comprising:
while operating in the first phase, turning on a low-side switch of the bridge circuit and maintaining the activated state of the low-side switch for a time period extending for more than one switching cycle; and
while operating in the first phase, turning off a high-side switch of the bridge circuit and maintaining the deactivated state of the high-side switch for the time period extending,
wherein a load terminal of the high-side switch is coupled to a load terminal of the low-side switch.

14. The method of claim 12, further comprising:
while operating in the first phase, determining that the magnitude of the signal has not exceeded a threshold level for a predetermined number of switching cycles; and
initiating the second phase in response to determining that the magnitude of the signal has not exceeded the threshold level for the predetermined number of switching cycles while operating in the first phase.

15. The method of claim 12, further comprising:
while operating in the second phase, determining that a predetermined time duration has elapsed since initiating the second phase; and
initiating the third phase in response to determining that the predetermined time duration has elapsed since initiating the second phase.

16. A device comprising a non-transitory computer-readable medium having executable instructions stored thereon, configured to be executable by processing circuitry for causing the processing circuitry to:
receive a signal indicating an electrical current through a tank circuit coupled to a bridge circuit;
while operating in a first phase of a startup mode, control the bridge circuit using peak detection of the signal and using zero-crossing detection of the signal, wherein the instructions to control the bridge circuit using the peak detection while operating in the first phase comprise:
instructions to determine that the magnitude of the signal exceeds a threshold level; and
instructions to toggle a switch of the bridge circuit in response to determining that the signal exceeds the threshold level;
while operating in a second phase of the startup mode after the first phase, control the bridge circuit using the zero-crossing detection of the signal by toggling the switch in response to determining that the magnitude of the signal crossed the zero level; and
while operating in a third phase of the startup mode after the second phase, control the bridge circuit using a discontinuous-current mode.

17. The device of claim 16, wherein the instructions are configured to cause the processing circuitry to control switches of the bridge circuit to operate as a half-bridge circuit at least in part by:
turning on a low-side switch of the bridge circuit and maintaining the activated state of the low-side switch for a time period extending for more than one switching cycle of the first phase; and
turning off a high-side switch of the bridge circuit and maintaining the deactivated state of the high-side switch for a time period extending,
wherein a load terminal of the high-side switch is coupled to a load terminal of the low-side switch.

18. The device of claim 16, wherein the instructions are further configured to cause the processing circuitry to:
   while operating in the first phase, determining that the magnitude of the signal has not exceeded a threshold level for a predetermined number of switching cycles; and
   initiating the second phase in response to determining that the magnitude of the signal has not exceeded the threshold level for the predetermined number of switching cycles while operating in the first phase.

19. The device of claim 16, wherein the instructions are further configured to cause the processing circuitry to:
   while operating in the second phase, determining that a predetermined time duration has elapsed since initiating the second phase; and
   initiating the third phase in response to determining that the predetermined time duration has elapsed since initiating the second phase.

* * * * *